United States Patent
Gandhi et al.

(10) Patent No.: US 9,530,344 B2
(45) Date of Patent: *Dec. 27, 2016

(54) CIRCUITS FOR CONTROLLING DISPLAY APPARATUS

(71) Applicant: Pixtronix, Inc., San Diego, CA (US)

(72) Inventors: Jignesh Gandhi, Burlington, MA (US); Jasper Lodewyk Steyn, Campbell, CA (US); John J. Fijol, Shrewsbury, MA (US); Roger W. Barton, Grand Marais, MN (US); Stephen R. Lewis, Reading, MA (US); Abraham McAllister, Annandale, VA (US); Nesbitt W. Hagood, IV, Andover, MA (US)

(73) Assignee: SnapTrack, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,176

(22) Filed: Jun. 24, 2015

(65) Prior Publication Data

US 2015/0294613 A1 Oct. 15, 2015

Related U.S. Application Data

(63) Continuation of application No. 13/019,215, filed on Feb. 1, 2011, now Pat. No. 9,087,486, which is a
(Continued)

(51) Int. Cl.
| | |
|---|---|
| *G09G 3/20* | (2006.01) |
| *G02B 26/00* | (2006.01) |
| *G02B 26/04* | (2006.01) |
| *G09G 3/34* | (2006.01) |
| *G06F 3/147* | (2006.01) |

(52) U.S. Cl.
CPC .......... *G09G 3/2081* (2013.01); *G02B 26/001* (2013.01); *G02B 26/004* (2013.01);
(Continued)

(58) Field of Classification Search
CPC ... G09G 3/2081; G09G 3/3406; G09G 3/2014
See application file for complete search history.

(56) References Cited

U.S. PATENT DOCUMENTS

| | | |
|---|---|---|
| 4,559,535 A | 12/1985 | Watkins et al. |
| 4,564,836 A | 1/1986 | Vuilleumier et al. |

(Continued)

FOREIGN PATENT DOCUMENTS

| | | |
|---|---|---|
| CN | 1898969 A | 1/2007 |
| CN | 101128765 A | 2/2008 |

(Continued)

OTHER PUBLICATIONS

Akimoto O. et al., "15.1: A 0.9-in UXGA/HDTV FLC Microdisplay," Society for Information Display, 2000, pp. 194-197.
(Continued)

*Primary Examiner* — Carolyn R Edwards
*Assistant Examiner* — Mansour M Said
(74) *Attorney, Agent, or Firm* — Weaver Austin Villeneuve & Sampson LLP

(57) ABSTRACT

A method of operating a display including loading image data to pixels in multiple rows of pixels in an array of pixels during a data loading phase, actuating the pixels in the multiple rows during an update phase, and illuminating at least one lamp during an lamp illumination phase to illuminate the actuated pixels to form an image on the display, in which each of the loading, actuating and illuminating phases partially overlap in time.

20 Claims, 22 Drawing Sheets

Related U.S. Application Data continuation-in-part of application No. 11/326,900, filed on Jan. 6, 2006, now Pat. No. 8,159,428, which is a continuation-in-part of application No. 11/251,035, filed on Oct. 14, 2005, now Pat. No. 7,271,945, which is a continuation-in-part of application No. 11/218,690, filed on Sep. 2, 2005, now Pat. No. 7,417,782, said application No. 13/019,215 is a continuation-in-part of application No. 11/643,042, filed on Dec. 19, 2006, now abandoned, and a continuation-in-part of application No. 11/361,294, filed on Feb. 23, 2006, now abandoned, said application No. 13/019,215 is a continuation-in-part of application No. 11/811,842, filed on Jun. 12, 2007, now Pat. No. 8,482,496, which is a continuation-in-part of application No. 12/652,477, filed on Jan. 5, 2010, now Pat. No. 9,082,353.

(60) Provisional application No. 60/655,827, filed on Feb. 23, 2005, provisional application No. 60/676,053, filed on Apr. 29, 2005, provisional application No. 60/751,909, filed on Dec. 19, 2005, provisional application No. 60/776,367, filed on Feb. 24, 2006, provisional application No. 60/881,757, filed on Jan. 19, 2007, provisional application No. 61/300,735, filed on Feb. 2, 2010.

(52) U.S. Cl.
CPC ............ *G02B 26/04* (2013.01); *G06F 3/147* (2013.01); *G09G 3/3406* (2013.01); *G09G 3/348* (2013.01); *G09G 3/3413* (2013.01); *G09G 3/3433* (2013.01); *G09G 3/2011* (2013.01); *G09G 3/2014* (2013.01); *G09G 3/2022* (2013.01); *G09G 3/3473* (2013.01); *G09G 2300/08* (2013.01); *G09G 2300/0814* (2013.01); *G09G 2300/0842* (2013.01); *G09G 2300/0857* (2013.01); *G09G 2300/0885* (2013.01); *G09G 2310/0235* (2013.01); *G09G 2310/0251* (2013.01); *G09G 2310/0254* (2013.01); *G09G 2310/0262* (2013.01); *G09G 2310/063* (2013.01); *G09G 2320/0646* (2013.01); *G09G 2330/021* (2013.01); *G09G 2360/144* (2013.01)

(56) References Cited

U.S. PATENT DOCUMENTS

| | | |
|---|---|---|
| 5,061,049 A | 10/1991 | Hornbeck |
| 5,062,689 A | 11/1991 | Koehler |
| 5,093,652 A | 3/1992 | Bull et al. |
| 5,096,279 A | 3/1992 | Hornbeck et al. |
| 5,142,405 A | 8/1992 | Hornbeck |
| 5,233,385 A | 8/1993 | Sampsell |
| 5,233,459 A | 8/1993 | Bozler et al. |
| 5,278,652 A | 1/1994 | Urbanus et al. |
| 5,280,277 A | 1/1994 | Hornbeck |
| 5,319,491 A | 6/1994 | Selbrede |
| 5,339,116 A | 8/1994 | Urbanus et al. |
| 5,359,345 A | 10/1994 | Hunter |
| 5,452,024 A | 9/1995 | Sampsell |
| 5,461,411 A | 10/1995 | Florence et al. |
| 5,493,439 A | 2/1996 | Engle |
| 5,497,172 A | 3/1996 | Doherty et al. |
| 5,510,824 A | 4/1996 | Nelson |
| 5,517,347 A | 5/1996 | Sampsell |
| 5,523,803 A | 6/1996 | Urbanus et al. |
| 5,526,051 A | 6/1996 | Gove et al. |
| 5,548,301 A | 8/1996 | Kornher et al. |
| 5,724,062 A | 3/1998 | Hunter |
| 5,731,802 A | 3/1998 | Aras et al. |
| 5,745,193 A | 4/1998 | Urbanus et al. |
| 5,745,281 A | 4/1998 | Yi et al. |
| 5,771,321 A | 6/1998 | Stern |
| 5,781,331 A | 7/1998 | Carr et al. |
| 5,784,189 A | 7/1998 | Bozler et al. |
| 5,794,761 A | 8/1998 | Renaud et al. |
| 5,835,256 A | 11/1998 | Huibers |
| 5,986,796 A | 11/1999 | Miles |
| 6,008,929 A | 12/1999 | Akimoto et al. |
| 6,034,807 A | 3/2000 | Little et al. |
| 6,046,840 A | 4/2000 | Huibers |
| 6,111,560 A | 8/2000 | May |
| 6,172,797 B1 | 1/2001 | Huibers |
| 6,201,633 B1 | 3/2001 | Peeters et al. |
| 6,225,991 B1 | 5/2001 | McKnight |
| 6,249,269 B1 | 6/2001 | Blalock et al. |
| 6,288,824 B1 | 9/2001 | Kastalsky |
| 6,288,829 B1 | 9/2001 | Kimura |
| 6,300,154 B2 | 10/2001 | Clark et al. |
| 6,323,834 B1 | 11/2001 | Colgan et al. |
| 6,329,971 B2 * | 12/2001 | McKnight ..................... 345/208 |
| 6,329,974 B1 | 12/2001 | Walker et al. |
| 6,388,661 B1 | 5/2002 | Richards |
| 6,411,423 B2 * | 6/2002 | Ham ............................ 359/233 |
| 6,424,329 B1 | 7/2002 | Okita |
| 6,486,997 B1 | 11/2002 | Bruzzone et al. |
| 6,556,258 B1 | 4/2003 | Yoshida et al. |
| 6,567,063 B1 | 5/2003 | Okita |
| 6,600,474 B1 | 7/2003 | Heines et al. |
| 6,621,488 B1 | 9/2003 | Takeuchi et al. |
| 6,633,301 B1 | 10/2003 | Dallas et al. |
| 6,650,455 B2 | 11/2003 | Miles |
| 6,650,822 B1 | 11/2003 | Zhou |
| 6,671,078 B2 | 12/2003 | Flanders et al. |
| 6,674,562 B1 | 1/2004 | Miles |
| 6,680,792 B2 | 1/2004 | Miles |
| 6,687,040 B2 | 2/2004 | Kimura |
| 6,700,554 B2 | 3/2004 | Ham et al. |
| 6,701,039 B2 | 3/2004 | Bourgeois et al. |
| 6,762,743 B2 | 7/2004 | Yoshihara et al. |
| 6,775,048 B1 | 8/2004 | Starkweather et al. |
| 6,778,162 B2 | 8/2004 | Kimura et al. |
| 6,795,064 B2 | 9/2004 | Walker et al. |
| 6,798,935 B2 | 9/2004 | Bourgeois et al. |
| 6,844,959 B2 | 1/2005 | Huibers et al. |
| 6,873,311 B2 | 3/2005 | Yoshihara et al. |
| 6,879,307 B1 | 4/2005 | Stern |
| 6,900,072 B2 | 5/2005 | Patel et al. |
| 6,906,847 B2 | 6/2005 | Huibers et al. |
| 6,911,964 B2 | 6/2005 | Lee et al. |
| 6,969,635 B2 | 11/2005 | Patel et al. |
| 6,980,349 B1 | 12/2005 | Huibers et al. |
| 7,042,618 B2 | 5/2006 | Selbrede et al. |
| 7,046,221 B1 | 5/2006 | Malzbender |
| 7,050,219 B2 | 5/2006 | Kimura |
| 7,057,790 B2 | 6/2006 | Selbrede |
| 7,092,142 B2 | 8/2006 | Selebrede et al. |
| 7,119,944 B2 | 10/2006 | Patel et al. |
| 7,123,796 B2 | 10/2006 | Steckl et al. |
| 7,198,982 B2 | 4/2007 | Patel et al. |
| 7,215,459 B2 | 5/2007 | Huibers et al. |
| 7,218,437 B2 | 5/2007 | Selbrede |
| 7,227,677 B2 | 6/2007 | Ravnkilde et al. |
| 7,274,416 B2 | 9/2007 | Feenstra et al. |
| 7,315,294 B2 | 1/2008 | Richards |
| 7,463,227 B2 | 12/2008 | Van Gorkom et al. |
| 8,159,428 B2 | 4/2012 | Hagood et al. |
| 8,698,980 B2 | 4/2014 | Chao et al. |
| 9,087,486 B2 | 7/2015 | Gandhi et al. |
| 2001/0043177 A1 | 11/2001 | Huston et al. |
| 2002/0051096 A1 | 5/2002 | Yamazaki et al. |
| 2002/0075205 A1 | 6/2002 | Kimura et al. |
| 2003/0043157 A1 | 3/2003 | Miles |
| 2003/0048370 A1 | 3/2003 | Koyama |
| 2003/0128218 A1 | 7/2003 | Struyk |
| 2003/0231160 A1 | 12/2003 | Yoshihara et al. |
| 2004/0080484 A1 | 4/2004 | Heines et al. |
| 2004/0246275 A1 | 12/2004 | Yoshihara et al. |
| 2004/0263502 A1 | 12/2004 | Dallas et al. |

(56) References Cited

U.S. PATENT DOCUMENTS

| | | | |
|---|---|---|---|
| 2005/0062708 | A1 | 3/2005 | Yoshihara et al. |
| 2005/0073471 | A1 | 4/2005 | Selbrede |
| 2005/0088404 | A1 | 4/2005 | Heines et al. |
| 2005/0104804 | A1 | 5/2005 | Feenstra et al. |
| 2005/0122560 | A1 | 6/2005 | Sampsell et al. |
| 2005/0168431 | A1 | 8/2005 | Chui |
| 2005/0172625 | A1 | 8/2005 | Starkweather et al. |
| 2005/0206991 | A1* | 9/2005 | Chui .............. G02B 26/001 359/290 |
| 2005/0212734 | A1 | 9/2005 | Kimura |
| 2005/0219676 | A1 | 10/2005 | Kimura et al. |
| 2005/0225732 | A1* | 10/2005 | Conner ............. H04N 9/3188 353/31 |
| 2005/0237596 | A1 | 10/2005 | Selbrede |
| 2006/0044246 | A1 | 3/2006 | Mignard |
| 2006/0044928 | A1 | 3/2006 | Chui et al. |
| 2006/0061559 | A1 | 3/2006 | King |
| 2006/0066937 | A1 | 3/2006 | Chui |
| 2006/0172745 | A1 | 8/2006 | Knowles |
| 2006/0238443 | A1 | 10/2006 | Derichs |
| 2006/0291774 | A1 | 12/2006 | Schoellmann et al. |
| 2007/0047051 | A1 | 3/2007 | Selbrede et al. |
| 2007/0047887 | A1 | 3/2007 | Selbrede |
| 2007/0086078 | A1 | 4/2007 | Hagood et al. |
| 2007/0172171 | A1 | 7/2007 | Van Ostrand et al. |
| 2011/0148948 | A1 | 6/2011 | Gandhi et al. |
| 2016/0096729 | A1 | 4/2016 | Villarreal et al. |

FOREIGN PATENT DOCUMENTS

| | | |
|---|---|---|
| EP | 1091342 A2 | 4/2001 |
| JP | H0895526 A | 4/1996 |
| JP | H09114421 A | 5/1997 |
| JP | 09189869 A | 7/1997 |
| JP | H1184419 A | 3/1999 |
| JP | 2001067010 A | 3/2001 |
| JP | 2002139683 A | 5/2002 |
| JP | 2002287718 A | 10/2002 |
| JP | 2002351431 A | 12/2002 |
| JP | 2003084314 A | 3/2003 |
| JP | 2003202519 A | 7/2003 |
| JP | 2004004216 A | 1/2004 |
| JP | 2004327025 A | 11/2004 |
| JP | 2005309416 A | 11/2005 |
| JP | 2007155983 A | 6/2007 |
| JP | 2008015081 A | 1/2008 |
| JP | 2008197668 A | 8/2008 |
| JP | 2008532068 A | 8/2008 |
| JP | 2008233898 A | 10/2008 |
| JP | 2008538009 A | 10/2008 |
| JP | 2010517072 A | 5/2010 |
| KR | 20010050623 A | 6/2001 |
| WO | WO-9819201 A1 | 5/1998 |
| WO | WO-2006017129 A2 | 2/2006 |
| WO | WO-2006091738 A1 | 8/2006 |
| WO | WO-2007075832 | 7/2007 |
| WO | WO-2008091339 A2 | 7/2008 |

OTHER PUBLICATIONS

Alt P.M., et al., "A Gray-Scale Addressing Technique for Thin-Film-Transistor/Liquid Crystal Displays," IBM J. Res. Develop., 36 (1), Jan. 1992, pp. 11-22.

Boer W.D., "Active Matrix Liquid Crystal Displays", Elsevier Science & Technology Books, ISBN #0750678135, Aug. 2005, Publisher's annotation in 2 pages.

Boer W.D., "AMLCD Electronics", Active Matrix Liquid Crystal Displays: Fundamentals and Applications, 2005 pp. 87-111, XP055089329, U.S.A, ISBN: 978-0-75-067813-1.

Boer W.D., "Improvement of Image Quality in AMLCDs", Active Matrix Liquid Crystal Displays: Fundamentals and Applications, 2005, pp. 139-177, XP055089313, U.S.A, ISBN: 978-0-75-067813-1.

Chino E. et al., "25.1: Invited Paper: Development of Wide-Color-Gamut Mobile Displays with Four-primary-color LCDs," Society for Information Display, 37 (2), 2006, pp. 1221-1224.

Clark N. A., et al., "FLC Microdisplays", Ferroelectrics, 246, 2000, pp. 97-110.

Doherty D. et al., "Pulse Width Modulation Control of DLP Projectors", TI Technical Journal, Jul.-Sep. 1998, No. 3, pp. 115-121.

Feenstra J. et al., "Electrowetting Displays", Liquavista BV, http://www.liquavista.com/documents/electrowetting_displays_whitepaper.pdf, Retrieved on Aug. 17, 2006, pp. 1-16.

Hornbeck J. "Digital Light Processing TM: A New MEMS-Based Display Technology," Technical Digest of the IEEJ 14th Sensor Symposium, Jun. 4-5, 1996, pp. 297-304.

International Search Report and Written Opinion issued May 20, 2011, during the prosecution of International Application No. PCT/US2011/023402.

Kunzman A. et al., "10.3 White Enhancement for Color Sequential DLP", Society for Information Display, Digest of Technical Papers, 1998.

Markandey V. et al., "Video Processing for DLP Display Systems," Texas Instruments Corporation, Mar. 13, 1996, pp. 21-32.

Ravnkilde J., et al., "Fabrication of Nickel Microshutter Arrays for Spatial Light Modulation", Mesomechanics, 2002, pp. 161-165. Also on their web site: http://www2.mic.dtu.dk/research/mems/publications/Papers/Dicon_Meso2002.pdf.

Takatori, et al., "6.3: Field-Sequential Smectic LCD with TFT Pixel Amplifier," SID 01, 2001, Digest, pp. 48-51.

Wang K., et al., "Highly Space-Efficient Electrostatic Zigzag Transmissive Micro-Optic Switches for an Integrated MEMS Optical Display System", Transducers 03 Conference, Jun. 8-12, 2003, vol. 1, pp. 575-575.

European Patent Office Examination Report dated Sep. 7, 2009 in European Patent Application No. 06847859.3.

U.S. Office Action dated Jul. 2, 2012 issued in U.S. Appl. No. 13/019,215.

U.S. Final Office Action dated Mar. 20, 2013 issued in U.S. Appl. No. 13/019,215.

U.S. Office Action dated Oct. 1, 2013 issued in U.S. Appl. No. 13/019,215.

U.S. Final Office Action dated Mar. 13, 2014 issued in U.S. Appl. No. 13/019,215.

U.S. Office Action dated Jul. 14, 2014 issued in U.S. Appl. No. 13/019,215.

U.S. Notice of Allowance dated Nov. 21, 2014 issued in U.S. Appl. No. 13/019,215.

U.S. Notice of Allowance dated Mar. 11, 2015 issued in U.S. Appl. No. 13/019,215.

Japanese Office Action dated Dec. 14, 2015 issued in Japanese Application No. 2014-241435.

Japanese Office Action dated May 30, 2016 issued in Japanese Application No. 2014-241435.

Korean Office Action dated Nov. 17, 2015 issued in Korean Application No. 2012-7022114.

\* cited by examiner

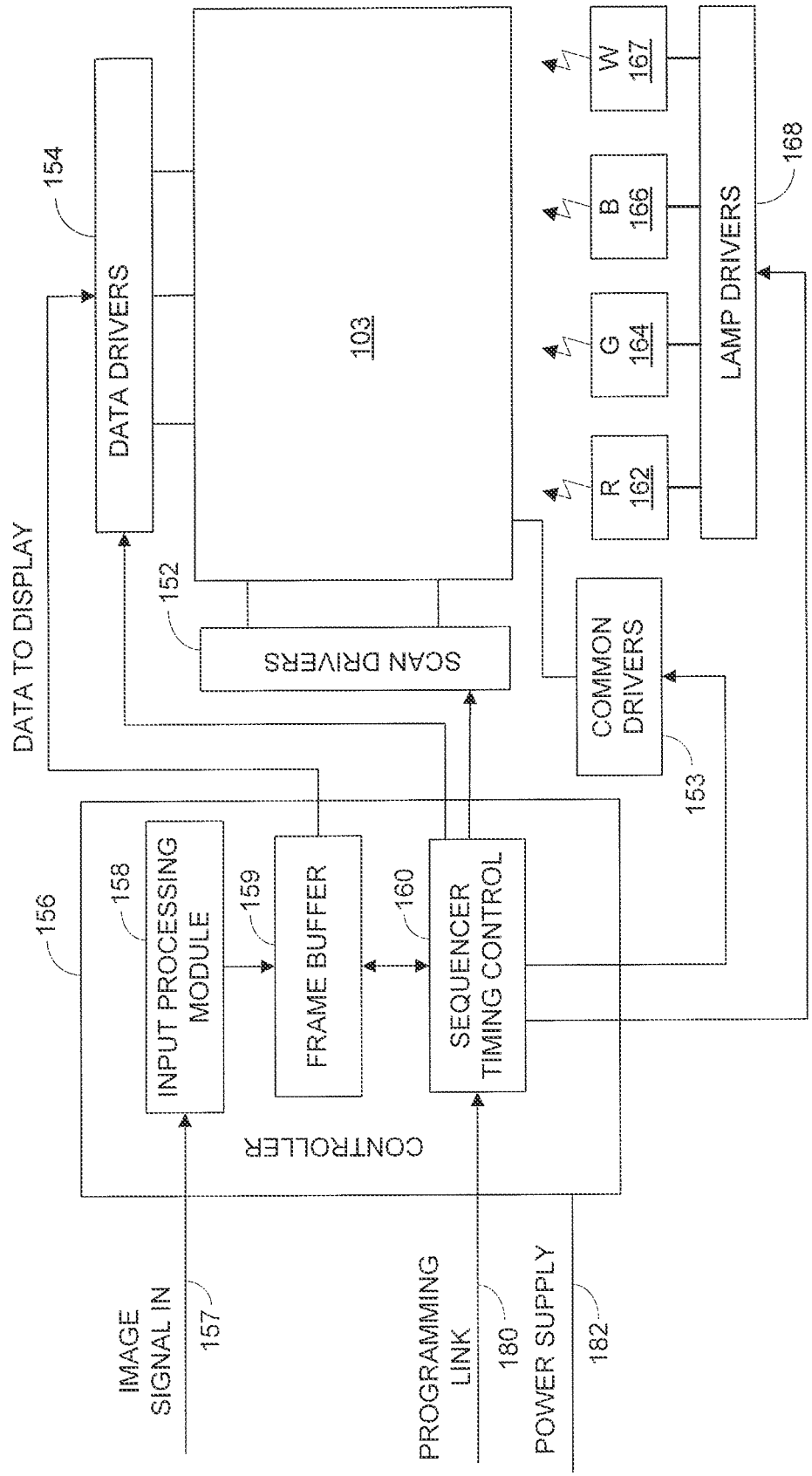

CIRCUITS FOR CONTROLLING DISPLAY APPARATUS

REFERENCE TO RELATED APPLICATIONS

This application is a continuation of and claims priority to U.S. patent application Ser. No. 13/019,215, filed on Feb. 1, 2011, entitled "Circuits for Controlling Display Apparatus", by Gandhi, et al.

U.S. patent application Ser. No. 13/019,215 claims priority to (1) U.S. patent application Ser. No. 11/326,900, filed Jan. 6, 2006, issued as U.S. Pat. No. 8,159,428 on Apr. 17, 2012, (2) U.S. patent application Ser. No. 11/643,042, filed Dec. 19, 2006, (3) U.S. patent application Ser. No. 11/811,842, filed Jun. 12, 2007, issued as U.S. Pat. No. 8,482,496 on Jul. 9, 2013, (4) U.S. patent application Ser. No. 12/652,477, filed on Jan. 5, 2010, and (5) U.S. Provisional Patent Application No. 61/300,735, filed on Feb. 2, 2010.

U.S. patent application Ser. No. 11/326,900 claims priority to U.S. patent application Ser. No. 11/251,035, filed on Oct. 14, 2005, issued as U.S. Pat. No. 7,271,945 on Sep. 18, 2007.

U.S. patent application Ser. No. 11/251,035 claims priority to U.S. patent application Ser. No. 11/218,690, filed on Sep. 2, 2005, issued as U.S. Pat. No. 7,417,782 on Aug. 26, 2008.

U.S. patent application Ser. No. 11/218,690 claims priority to (1) U.S. Provisional Patent Application No. 60/655,827, filed on Feb. 23, 2005, and (2) U.S. Provisional Patent Application No. 60/676,053, filed on Apr. 29, 2005.

U.S. patent application Ser. No. 11/643,042 claims priority to (1) U.S. Provisional Patent Application No. 60/751,909, filed on Dec. 19, 2005, (2) U.S. patent application Ser. No. 11/361,294, filed on Feb. 23, 2006, and (3) U.S. Provisional Patent Application No. 60/776,367, filed on Feb. 24, 2006.

U.S. patent application Ser. No. 11/361,294 claims priority to (1) U.S. Provisional Patent Application No. 60/655,827, filed Feb. 23, 2005, and (2) U.S. Provisional Patent Application No. 60/676,053, filed on Apr. 29, 2005.

U.S. patent application Ser. No. 11/811,842 claims priority to U.S. Provisional Patent Application No. 60/881,757, filed on Jan. 19, 2007.

Each of the above-identified patent applications and patents is hereby incorporated by reference in its entirety and for all purposes.

FIELD OF THE INVENTION

In general, the invention relates to the field of imaging displays, in particular, the invention relates to controller circuits and processes for controlling light modulators incorporated into imaging displays.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Direct-view displays using mechanical light modulators have not yet demonstrated sufficiently attractive combinations of brightness and low power. There is a need in the art for fast, bright, low-powered mechanically actuated direct-view displays. Specifically there is a need for direct-view displays that can be driven at high speeds and at low voltages for improved image quality and reduced power consumption.

In contrast to projection displays in which switching circuitry and light modulators can be built on relatively small die cut from silicon substrates, most direct-view displays require the fabrication of light modulators on much larger substrates. In addition, in many cases, particularly for backlit direct view displays, both the control circuitry and the light modulators are preferably formed on transparent substrates. As a result, many typical semiconductor manufacturing processes are inapplicable. New switching circuits and control algorithms often need to be developed to address the fundamental differences in materials, process technology, and performance characteristics of MEMS devices built on transparent substrates. A need remains for MEMS direct-view displays that incorporate modulation processes in conjunction with switching circuitry that yield detailed images along with rich levels of grayscale and contrast.

SUMMARY

According to one aspect of the invention, a method of operating a display includes loading image data to pixels in multiple rows of pixels in an array of pixels during a data loading phase, actuating the pixels in at least two rows and at least two columns during an update phase, and illuminating at least one lamp during an lamp illumination phase to illuminate the actuated pixels to form an image on the display, in which each of the loading, update and illumination phases partially overlap with at least one other phase in time.

In certain embodiment, the lamp illumination phase completely overlaps in time with the data loading phase for at least one bit of lamp output. In certain embodiments, the update phase comprises transmitting a plurality of update signals. In one aspect, the update phase includes first and second sub-phases. In one aspect, a first update signal of the plurality of update signals further comprises a first and a second signal phase corresponding to the first and second sub-phases, and the data loading phase overlaps in time with the first signal phase of the first update signal. In one aspect, the first signal phase corresponds to a reset phase.

In an embodiment, the method includes a second update signal of the plurality of update signals having a first and a second signal phase corresponding to the first and second sub-phases, in which the lamp illumination phase overlaps in time the transmission of both the second signal phase of the first update signal and the first signal phase of the second update signal. In one aspect, the first signal phase corresponds to an electrical setting sub-phase of the update phase and the second signal phase corresponds to a mechanical reaction sub-phase of the update phase. In one aspect, the data loading phase overlaps in time with the mechanical reaction sub-phase. In an embodiment, the method includes moving a shutter during a shutter transition phase, in which the lamp illumination phase partially overlaps the shutter transition phase in time. In one aspect the lamp illumination phase overlaps the shutter transition during a reset phase. In an embodiment, the data loading phase overlaps the end of the update phase and the beginning of the lamp illumination phase in time. In an embodiment, each of the loading, update and illumination phases all at least partially overlap each other in time. In an embodiment, at least one of the loading, update and illumination phases partially overlap with at least one other phase in time. In one aspect, the display is built upon a transparent substrate. In one aspect, the display includes an array of MEMS light modulators. In one aspect, the display includes an array of shutter-based light modulators.

BRIEF DESCRIPTION OF THE DRAWINGS

The foregoing discussion will be understood more readily from the following detailed description of the invention with reference to the following drawings:

FIG. 1B is a block diagram of the display apparatus of FIG. 1A, according to an illustrative embodiment of the invention;

DESCRIPTION OF CERTAIN ILLUSTRATIVE EMBODIMENTS

To provide an overall understanding of the invention, certain illustrative embodiments will now be described, including apparatus and methods for displaying images. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1A:
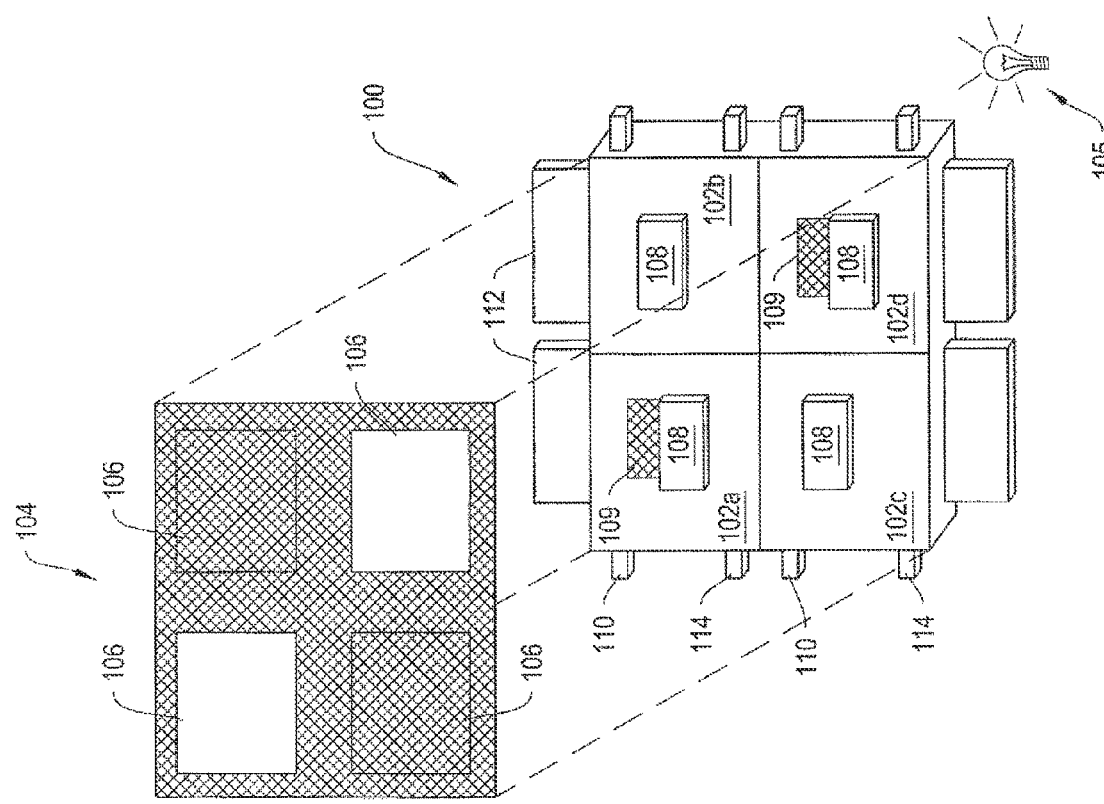
FIG. 1A is an isometric view of display apparatus, according to an illustrative embodiment of the invention.

FIG. 1A is a schematic diagram of a direct-view MEMS-based display apparatus 100, according to an illustrative embodiment of the invention. The display apparatus 100 includes a plurality of light modulators 102a-102d (generally "light modulators 102") arranged in rows and columns. In the display apparatus 100, light modulators 102a and 102d are in the open state, allowing light to pass. Light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e. by use of a frontlight. In one of the closed or open states, the light modulators 102 interfere with light in an optical path by, for example, and without limitation, blocking, reflecting, absorbing, filtering, polarizing, diffracting, or otherwise altering a property or path of the light.

In the display apparatus 100, each light modulator 102 corresponds to a pixel 106 in the image 104. In other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide grayscale in an image 104. With respect to an image, a "pixel" corresponds to the smallest picture element defined by the resolution of the image. With respect to structural components of the display apparatus 100, the term "pixel" refers to the combined mechanical and electrical components utilized to modulate the light that forms a single pixel of the image.

Display apparatus 100 is a direct-view display in that it does not require imaging optics. The user sees an image by looking directly at the display apparatus 100. In alternate embodiments the display apparatus 100 is incorporated into a projection display. In such embodiments, the display forms an image by projecting light onto a screen or onto a wall. In projection applications the display apparatus 100 is substantially smaller than the projected image 104.

Direct-view displays may operate in either a transmissive or reflective mode. In a transmissive display, the light modulators filter or selectively block light which originates from a lamp or lamps positioned behind the display. The light from the lamps is optionally injected into a light guide or "backlight". Transmissive direct-view display embodiments are often built onto transparent or glass substrates to facilitate a sandwich assembly arrangement where one substrate, containing the light modulators, is positioned directly on top of the backlight. In some transmissive display embodiments, a color-specific light modulator is created by associating a color filter material with each modulator 102. In other transmissive display embodiments colors can be generated, as described below, using a field sequential color method by alternating illumination of lamps with different primary colors. A number of different types of lamps can be employed in the displays, including without limitation: incandescent lamps, fluorescent lamps, lasers, light emitting diodes (LEDs), or any other suitable light source known to those of skill in the art. Further, lamps can be combined into a single assembly containing multiple lamps. For instance a combination of red, green, and blue LEDs can be combined with or substituted for a white LED in a small semiconductor chip, or assembled into a small multi-lamp package. Similarly each lamp can represent an assembly of 4-color LEDs, for instance a combination of red, yellow, green, and blue LEDs.

Each light modulator 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material.

The display apparatus also includes a control matrix connected to the substrate and to the light modulators for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

FIG. 1B is a block diagram 150 of the display apparatus 100. Referring to FIGS. 1A and 1B, in addition to the elements of the display apparatus 100 described above, as depicted in the block diagram 150, the display apparatus 100 includes a plurality of scan drivers 152 (also referred to as "write enabling voltage sources") and a plurality of data drivers 154 (also referred to as "data voltage sources"). The scan drivers 152 apply write enabling voltages to scan-line interconnects 110. The data drivers 154 apply data voltages to the data interconnects 112. In some embodiments of the display apparatus, the data drivers 154 are configured to provide analog data voltages to the light modulators, especially where the gray scale of the image 104 is to be derived in analog fashion. In analog operation the light modulators 102 are designed such that when a range of intermediate voltages is applied through the data interconnects 112 there results a range of intermediate open states in the shutters 108 and therefore a range of intermediate illumination states or gray scales in the image 104.

In other cases the data drivers 154 are configured to apply only a reduced set of 2, 3, or 4 digital voltage levels to the control matrix. These voltage levels are designed to set, in digital fashion, either an open state or a closed state to each of the shutters 108.

The scan drivers 152 and the data drivers 154 are connected to digital controller circuit 156 (also referred to as the "controller 156"). The controller 156 includes an input processing module 158, which processes an incoming image signal 157 into a digital image format appropriate to the spatial addressing and the gray scale capabilities of the display 100. The pixel location and gray scale data of each image is stored in a frame buffer 159 so that the data can be fed out as needed to the data drivers 154. The data is sent to the data drivers 154 in mostly serial fashion, organized in predetermined sequences grouped by rows and by image frames. The data drivers 154 can include series to parallel data converters, level shifting, and for some applications digital to analog voltage converters.

The display 100 apparatus optionally includes a set of common drivers 153, also referred to as common voltage sources. In some embodiments the common drivers 153 provide a DC common potential to all light modulators within the array of light modulators 103, for instance by supplying voltage to a series of common interconnects 114. In other embodiments the common drivers 153, following commands from the controller 156, issue voltage pulses or signals to the array of light modulators 103, for instance global actuation pulses which are capable of driving and/or initiating simultaneous actuation of all light modulators in multiple rows and columns of the array 103.

All of the drivers (e.g., scan drivers 152, data drivers 154, and common drivers 153) for different display functions are time-synchronized by a timing-control module 160 in the controller 156. Timing commands from the module 160 coordinate the illumination of red, green and blue and white lamps (162, 164, 166, and 167 respectively) via lamp drivers 168, the write-enabling and sequencing of specific rows within the array of pixels 103, the output of voltages from the data drivers 154, and the output of voltages that provide for light modulator actuation.

The controller 156 determines the sequencing or addressing scheme by which each of the shutters 108 in the array 103 can be re-set to the illumination levels appropriate to a new image 104. Details of suitable addressing, image formation, and gray scale techniques can be found in U.S. patent application Ser. Nos. 11/326,696 and 11/643,042, which are incorporated herein by reference in their entirety. New images 104 can be set at periodic intervals. For instance, for video displays, the color images 104 or frames of video are refreshed at frequencies ranging from 10 to 300 Hertz. In some embodiments the setting of an image frame to the array 103 is synchronized with the illumination of the lamps 162, 164, and 166 such that alternate image frames are illuminated with an alternating series of colors, such as red, green, and blue. The image frames for each respective color is referred to as a color sub-frame. In this method, referred to as the field sequential color method, if the color sub-frames are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 156 determines the addressing sequence and/or the time intervals between image frames to produce images 104 with appropriate gray scale. The process of generating varying levels of grayscale by controlling the amount of time a shutter 108 is open in a particular frame is referred to as time division gray scale. In one embodiment of time division gray scale, the controller 156 determines the time period or the fraction of time within each frame that a shutter 108 is allowed to remain in the open state, according to the illumination level or gray scale desired of that pixel. In other implementations, for each image frame, the controller 156 sets a plurality of sub-frame images in multiple rows and columns of the array 103, and the controller alters the duration over which each sub-frame image is illuminated in proportion to a gray scale value or significance value employed within a coded word for gray scale. For instance, the illumination times for a series of sub-frame images can be varied in proportion to the binary coding series 1, 2, 4, 8 . . . . The shutters 108 for each pixel in the array 103 are then set to either the open or closed state within a sub-frame image according to the value at a corresponding position within the pixel's binary coded word for gray level.

In other implementations, the controller alters the intensity of light from the lamps 162, 164, and 166 in proportion to the gray scale value desired for a particular sub-frame image. A number of hybrid techniques are also available for forming colors and gray scale from an array of shutters 108.

For instance, the time division techniques described above can be combined with the use of multiple shutters 108 per pixel, or the gray scale value for a particular sub-frame image can be established through a combination of both sub-frame timing and lamp intensity. Details of these and other embodiments can be found in U.S. patent application Ser. No. 11/643,042, referenced above.

In some implementations the data for an image state 104 is loaded by the controller 156 to the modulator array 103 by a sequential addressing of individual rows, also referred to as scan lines. For each row or scan line in the sequence, the scan driver 152 applies a write-enable voltage to the write enable interconnect 110 for that row of the array 103, and subsequently the data driver 154 supplies data voltages, corresponding to desired shutter states, for each column in the selected row. This process repeats until data has been loaded for all rows in the array. In some implementations the sequence of selected rows for data loading is linear, proceeding from top to bottom in the array. In other implementations the sequence of selected rows is pseudo-randomized, in order to minimize visual artifacts. And in other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array 103 is separated in time from the process of actuating the shutters 108. In these implementations, the modulator array 103 may include data memory elements for each pixel in the array 103 and the control matrix may include a global actuation interconnect for carrying trigger signals, from common driver 153, to initiate simultaneous actuation of shutters 108 according to data stored in the memory elements. Various addressing sequences, many of which are described in U.S. patent application Ser. No. 11/643,042, can be coordinated by means of the timing control module 160.

In alternative embodiments, the array of pixels 103 and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The display 100 is comprised of a plurality of functional blocks including the timing control module 160, the frame buffer 159, scan drivers 152, data drivers 154, and drivers 153 and 168. Each block can be understood to represent either a distinguishable hardware circuit and/or a module of executable code. In some implementations the functional blocks are provided as distinct chips or circuits connected together by means of circuit boards and/or cables. Alternately, many of these circuits can be fabricated along with the pixel array 103 on the same substrate of glass or plastic. In other implementations, multiple circuits, drivers, processors, and/or control functions from block diagram 150 may be integrated together within a single silicon chip, which is then bonded directly to the transparent substrate holding pixel array 103.

The controller 156 includes a programming link 180 by which the addressing, color, and/or gray scale algorithms, which are implemented within controller 156, can be altered according to the needs of particular applications. In some embodiments, the programming link 180 conveys information from environmental sensors, such as ambient light or temperature sensors, so that the controller 156 can adjust imaging modes or backlight power in correspondence with environmental conditions. The controller 156 also comprises a power supply input 182 which provides the power needed for lamps as well as light modulator actuation. Where necessary, the drivers 152 153, 154, and/or 168 may include or be associated with DC-DC converters for transforming an input voltage at 182 into various voltages sufficient for the actuation of shutters 108 or illumination of the lamps, such as lamps 162, 164, 166, and 167.

Field Sequential Color/Time Division Grayscale

The human brain, in response to viewing rapidly changing images, for example, at frequencies of greater than 20 Hz, averages images together to perceive an image which is the combination of the images displayed within a corresponding period. This phenomenon can be utilized to display color images while using only single light modulators for each pixel of a display, using a technique referred to in the art as field sequential color. The use of field sequential color techniques in displays eliminates the need for color filters and multiple light modulators per pixel. In a field sequential color enabled display, an image frame to be displayed is divided into a number of sub-frame images, each corresponding to a particular color component (for example, red, green, or blue) of the original image frame. For each sub-frame image, the light modulators of a display are set into states corresponding to the color component's contribution to the image. The light modulators then are illuminated by a lamp of the corresponding color. The sub-images are displayed in sequence at a frequency (for example, greater than 60 Hz) sufficient for the brain to perceive the series of sub-frame images as a single image. The data used to generate the sub-frames are often fractured in various memory components. For example, in some displays, data for a given row of display are kept in a shift-register dedicated to that row. Image data is shifted in and out of each shift register to a light modulator in a corresponding column in that row of the display according to a fixed clock cycle.

Figure 1C:
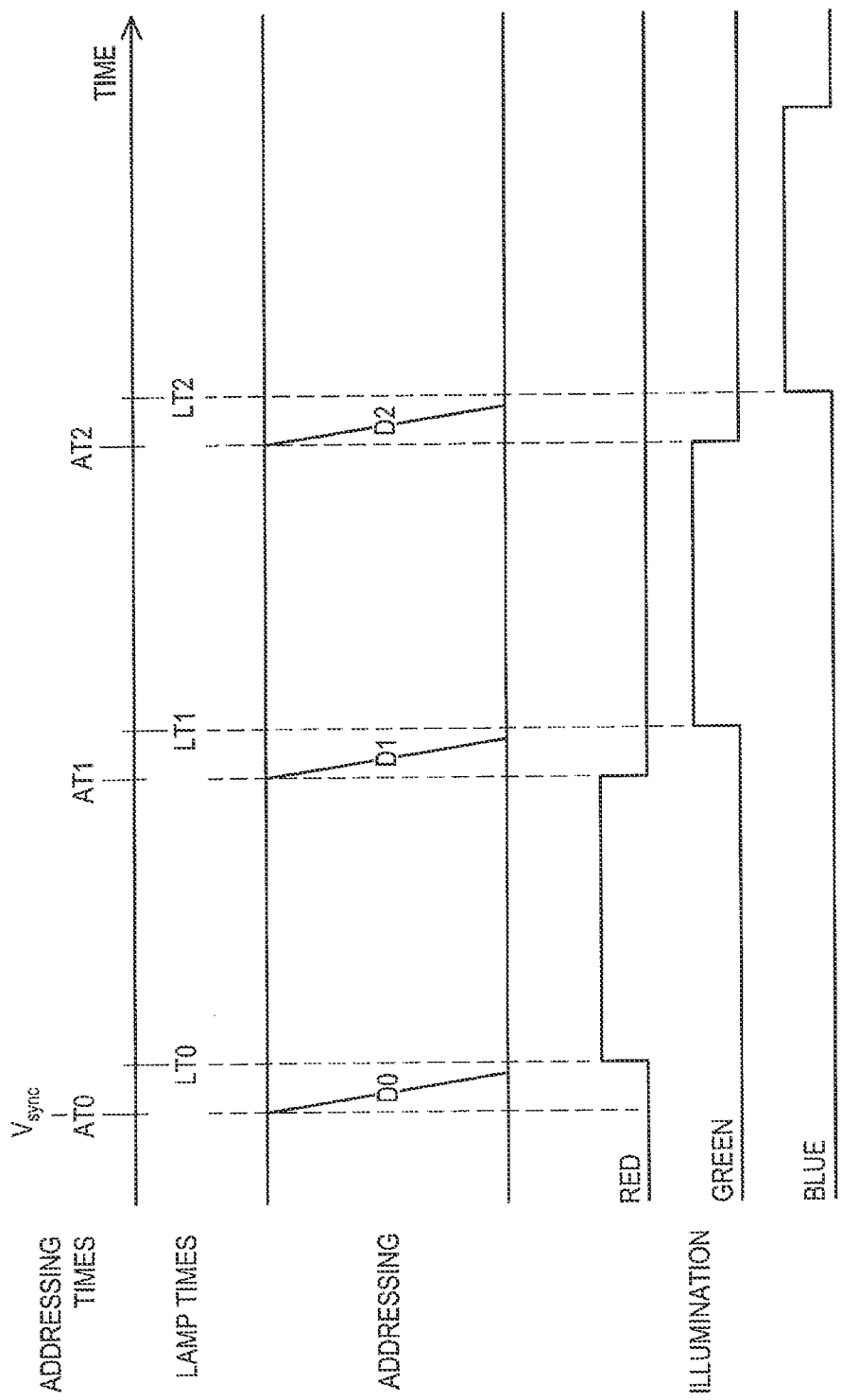
FIG. 1C is a timing diagram for a method of displaying an image on a display using a field sequential color technique, according to an illustrative embodiment of the invention.

FIG. 1C is a timing diagram corresponding to a display process for displaying images using field sequential color, which can be implemented according to an illustrative embodiment of the invention, for example, by a MEMS direct-view display described in FIG. 1B. The timing diagrams included herein, including the timing diagram of FIG. 1C, conform to the following conventions. The top portions of the timing diagrams illustrate light modulator addressing events. The bottom portions illustrate lamp illumination events.

The addressing portions depict addressing events by diagonal lines spaced apart in time. Each diagonal line corresponds to a series of individual data loading events during which data is loaded into each row of an array of light modulators, one row at a time. Depending on the control matrix used to address and drive the modulators included in the display, each loading event may require a waiting period to allow the light modulators in a given row to actuate. In some implementations, all rows in the array of light modulators are addressed prior to actuation of any of the light modulators. Upon completion of loading data into the last row of the array of light modulators, all light modulators are actuated substantially simultaneously.

Lamp illumination events are illustrated by pulse trains corresponding to each color of lamp included in the display. Each pulse indicates that the lamp of the corresponding color is illuminated, thereby displaying the sub-frame image loaded into the array of light modulators in the immediately preceding addressing event.

The time at which the first addressing event in the display of a given image frame begins is labeled on each timing diagram as AT0. In most of the timing diagrams, this time falls shortly after the detection of a voltage pulse vsync, which precedes the beginning of each video frame received by a display. The times at which each subsequent addressing event takes place are labeled as AT1, AT2, . . . AT(n−1), where n is the number of sub-frame images used to display the image frame. In some of the timing diagrams, the diagonal lines are further labeled to indicate the data being loaded into the array of light modulators. For example, in the timing diagram of FIG. 1C, D0 represents the first data loaded into the array of light modulators for a frame and D(n−1) represents the last data loaded into the array of light modulators for the frame. In the timing diagrams of FIG. 1D, the data loaded during each addressing event corresponds to a color sub-frame image.

Figure 1D:
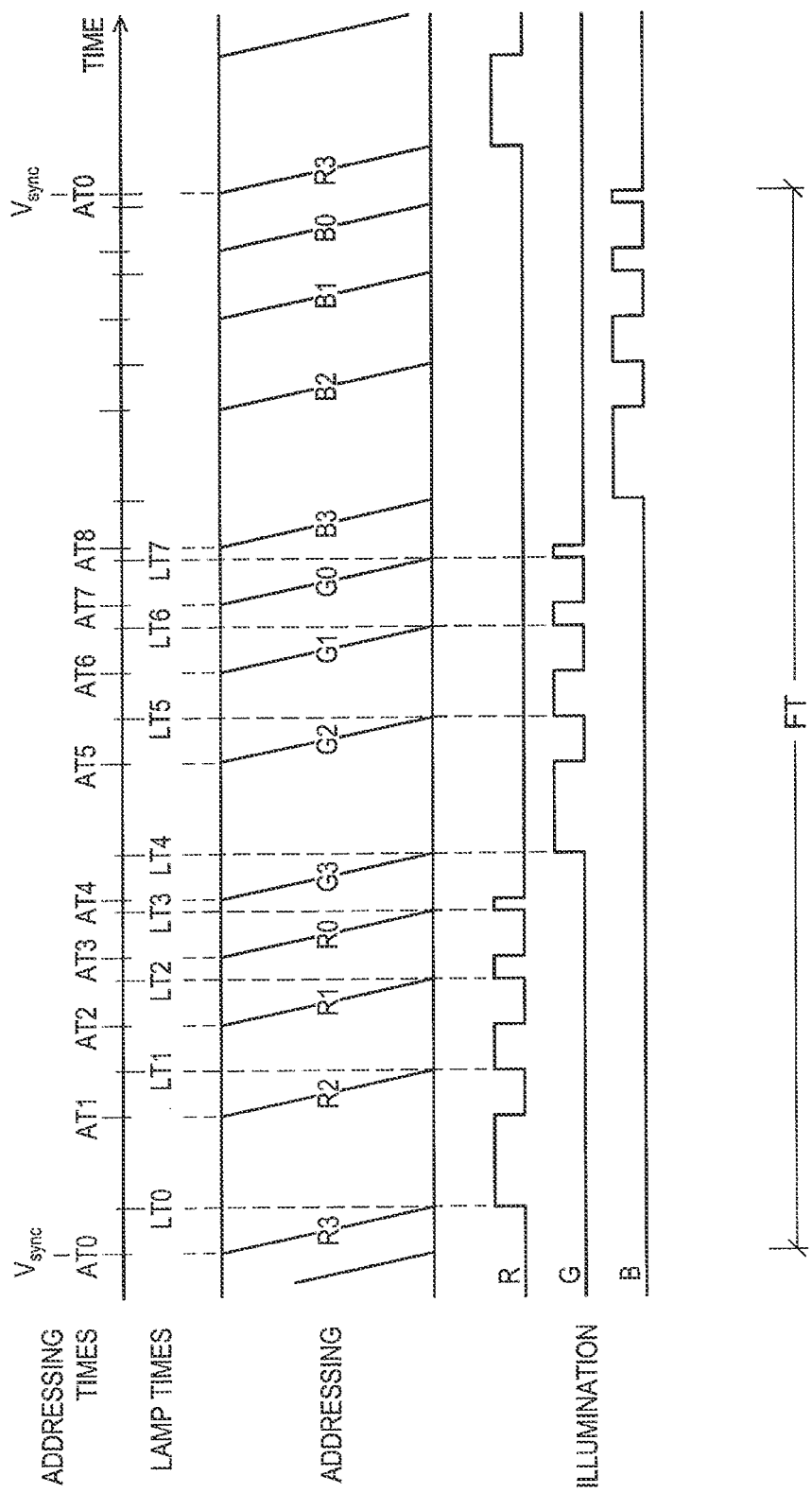
FIG. 1D is a timing diagram illustrating the timing of various image formation events using a coded time division grayscale technique, according to an illustrative embodiment of the invention.

FIG. 1D is a timing diagram that corresponds to a coded-time division grayscale display process in which image frames are displayed by displaying four sub-frame images for each of three color components (red, green, and blue) of the image frame. Each sub-frame image displayed of a given color is displayed at the same intensity for half as long a time period as the prior sub-frame image, thereby implementing a binary grayscale coding scheme for the sub-frame images. The data which is loaded into the array for each sub-frame image is referred to as a sub-frame data set and, for the example of FIG. 1D, the sub-frame data set is referred to as a bitplane. A bitplane includes data for pixels in multiple columns and multiple rows of a display corresponding to a single significance value of a grayscale coded word for a color component in the image frame. For the example of a binary coding scheme, each bitplane includes array data corresponding to a single binary bit of the coded word for color and grayscale.

The display of an image frame begins upon the detection of a vsync pulse. The first sub-frame data set R3, stored beginning at memory location M0, is loaded into the array of light modulators 103 in an addressing event that begins at time AT0. The red lamp is then illuminated at time LT0. LT0 is selected such that it occurs after each of the rows in the array of light modulators 103 has been addressed, and the light modulators included therein have actuated. At time AT1, the controller 156 of the direct-view display both extinguishes the red lamp and begins loading the subsequent bitplane, R2, into the array of light modulators 103. This bitplane is stored beginning at memory location M1. The process repeats until all bitplanes have been displayed. For example, at time AT4, the controller 156 extinguishes the red lamp and begins loading the most significant green bitplane, G3, into the array of light modulators 103. Similarly at time LT6, the controller 156 turns on the green lamp until time AT7, at which it time it is extinguished again.

The time period between vsync pulses in the timing diagram is indicated by the symbol FT, indicating a frame time. In some implementations the addressing times AT0, AT1, etc. as well as the lamp times LT0, LT1, etc. are designed to accomplish 4 sub-frame images per color within a frame time FT of 16.6 milliseconds, i.e. according to a frame rate of 60 Hz. In other implementations the time values can be altered to accomplish 4 sub-frame images per color within a frame time FT of 33.3 milliseconds, i.e. according to a frame rate of 30 Hz. In other implementations frame rates as low as 24 Hz may be employed or frame rates in excess of 100 Hz may be employed.

In the particular implementation of coded time division gray scale illustrated by the timing diagram in FIG. 1D, the controller outputs 4 sub-frame images to the array 103 of light modulators for each color to be displayed. The illumination of each of the 4 sub-frame images is weighted according to the binary series 1, 2, 4, 8. The display process in the timing diagram of FIG. 1D, therefore, displays a 4-digit binary word for gray scale in each color, that is, it is capable of displaying 16 distinct gray scale levels for each color, despite the loading of only 4 sub-images per color. Through combinations of the colors, the implementation of the timing diagram of FIG. 1D is capable of displaying more than 4000 distinct colors.

MEMS Light Modulators

Figure 2A:
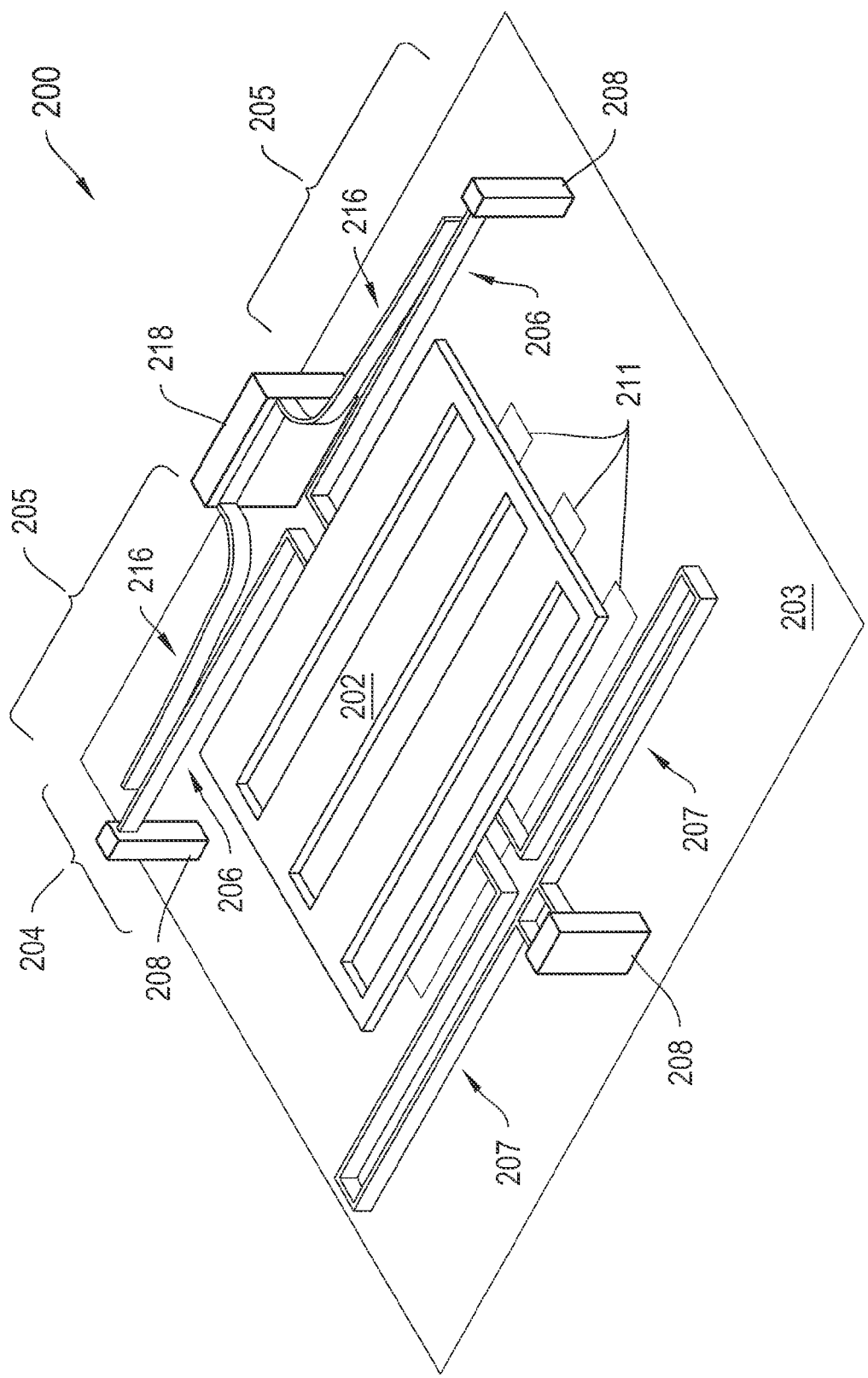
FIG. 2A is a perspective view of an illustrative shutter-based light modulator suitable for incorporation into the MEMS-based display of FIG. 1A, according to an illustrative embodiment of the invention.

FIG. 2A is a perspective view of an illustrative shutter-based light modulator 200 suitable for incorporation into the MEMS-based display apparatus 100 of FIG. 1A, according to an illustrative embodiment of the invention. The shutter-based light modulator 200 (also referred to as shutter assembly 200) includes a shutter 202 coupled to an actuator 204. The actuator 204 is formed from two separate compliant electrode beam actuators 205 (the "actuators 205"), as described in U.S. Pat. No. 7,271,945, filed on Sep. 18, 2007. The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The load anchors 208 physically connect the compliant load beams 206 and the shutter 202 to the surface 203 and electrically connect the load beams 206 to a bias voltage, in some instances, ground.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

The surface 203 includes one or more apertures 211 for admitting the passage of light. If the shutter assembly 200 is formed on an opaque substrate, made, for example, from silicon, then the surface 203 is a surface of the substrate, and the apertures 211 are formed by etching an array of holes through the substrate. If the shutter assembly 200 is formed on a transparent substrate, made, for example, of glass or plastic, then the surface 203 is a surface of a light blocking layer deposited on the substrate, and the apertures are formed by etching the surface 203 into an array of holes 211. The apertures 211 can be generally circular, elliptical, polygonal, serpentine, or irregular in shape.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 is removed, the load beams 206 push the shutter 202 back into its initial position, releasing the stress stored in the load beams 206.

The shutter assembly 200, also referred to as an elastic shutter assembly, incorporates a passive restoring force, such as a spring, for returning a shutter to its rest or relaxed position after voltages have been removed. A number of elastic restore mechanisms and various electrostatic couplings can be designed into or in conjunction with electrostatic actuators, the compliant beams illustrated in shutter assembly 200 being just one example. Other examples are described in U.S. Pat. No. 7,271,945 and U.S. patent application Ser. No. 11/326,696, which are incorporated herein by reference in their entirety. For instance, a highly non-linear voltage-displacement response can be provided which favors an abrupt transition between "open" vs "closed" states of operation, and which, in many cases, provides a bi-stable or hysteretic operating characteristic for the shutter assembly. Other electrostatic actuators can be designed with more incremental voltage-displacement responses and with considerably reduced hysteresis, as may be preferred for analog gray scale operation.

The actuator 205 within the elastic shutter assembly is said to operate between a closed or actuated position and a relaxed position. The designer, however, can choose to place apertures 211 such that shutter assembly 200 is in either the "open" state, i.e. passing light, or in the "closed" state, i.e. blocking light, whenever actuator 205 is in its relaxed position. For illustrative purposes, it is assumed below that elastic shutter assemblies described herein are designed to be open in their relaxed state.

In many cases it is preferable to provide a dual set of "open" and "closed" actuators as part of a shutter assembly so that the control electronics are capable of electrostatically driving the shutters into each of the open and closed states.

Figure 2B:
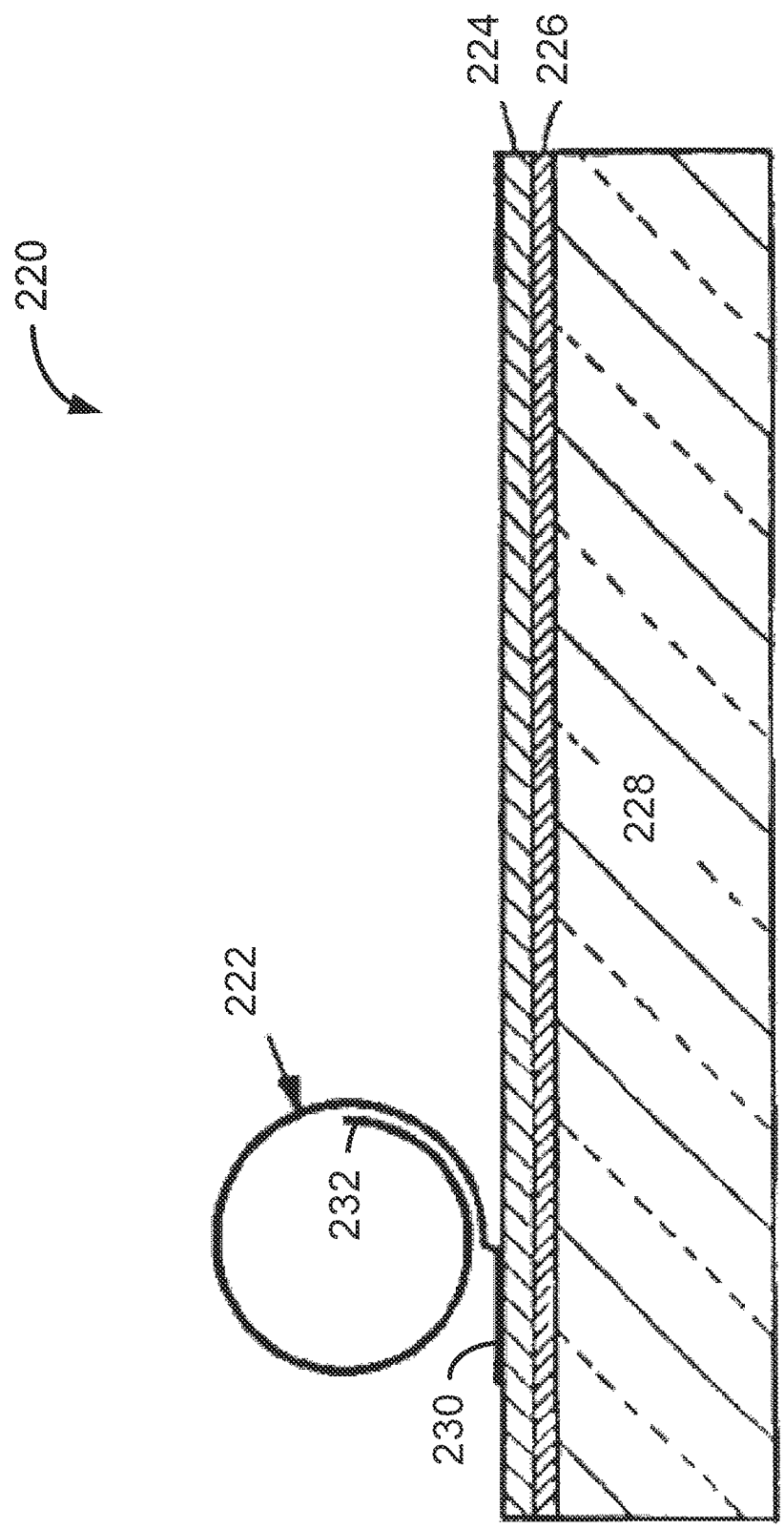
FIG. 2B is a cross-sectional view of a rollershade-based light modulator suitable for incorporation into the MEMS-based display of FIG. 1A, according to an illustrative embodiment of the invention.

Display apparatus 100, in alternative embodiments, includes light modulators other than transverse shutter-based light modulators, such as the shutter assembly 200 described above. For example, FIG. 2B is a cross-sectional view of a rolling actuator shutter-based light modulator 220 suitable for incorporation into an alternative embodiment of the MEMS-based display apparatus 100 of FIG. 1A, according to an illustrative embodiment of the invention. As described further in U.S. Pat. No. 5,233,459, entitled "Electric Display Device," and U.S. Pat. No. 5,784,189, entitled "Spatial Light Modulator," the entireties of which are incorporated herein by reference, a rolling actuator-based light modulator includes a moveable electrode disposed opposite a fixed electrode and biased to move in a preferred direction to produce a shutter upon application of an electric field. In one embodiment, the light modulator 220 includes a planar electrode 226 disposed between a substrate 228 and an insulating layer 224 and a moveable electrode 222 having a fixed end 230 attached to the insulating layer 224. In the absence of any applied voltage, a moveable end 232 of the moveable electrode 222 is free to roll towards the fixed end 230 to produce a rolled state. Application of a voltage between the electrodes 222 and 226 causes the moveable electrode 222 to unroll and lie flat against the insulating layer 224, whereby it acts as a shutter that blocks light traveling through the substrate 228. The moveable electrode 222 returns to the rolled state by means of an elastic restoring force after the voltage is removed. The bias towards a rolled state may be achieved by manufacturing the moveable electrode 222 to include an anisotropic stress state.

Figure 2C:
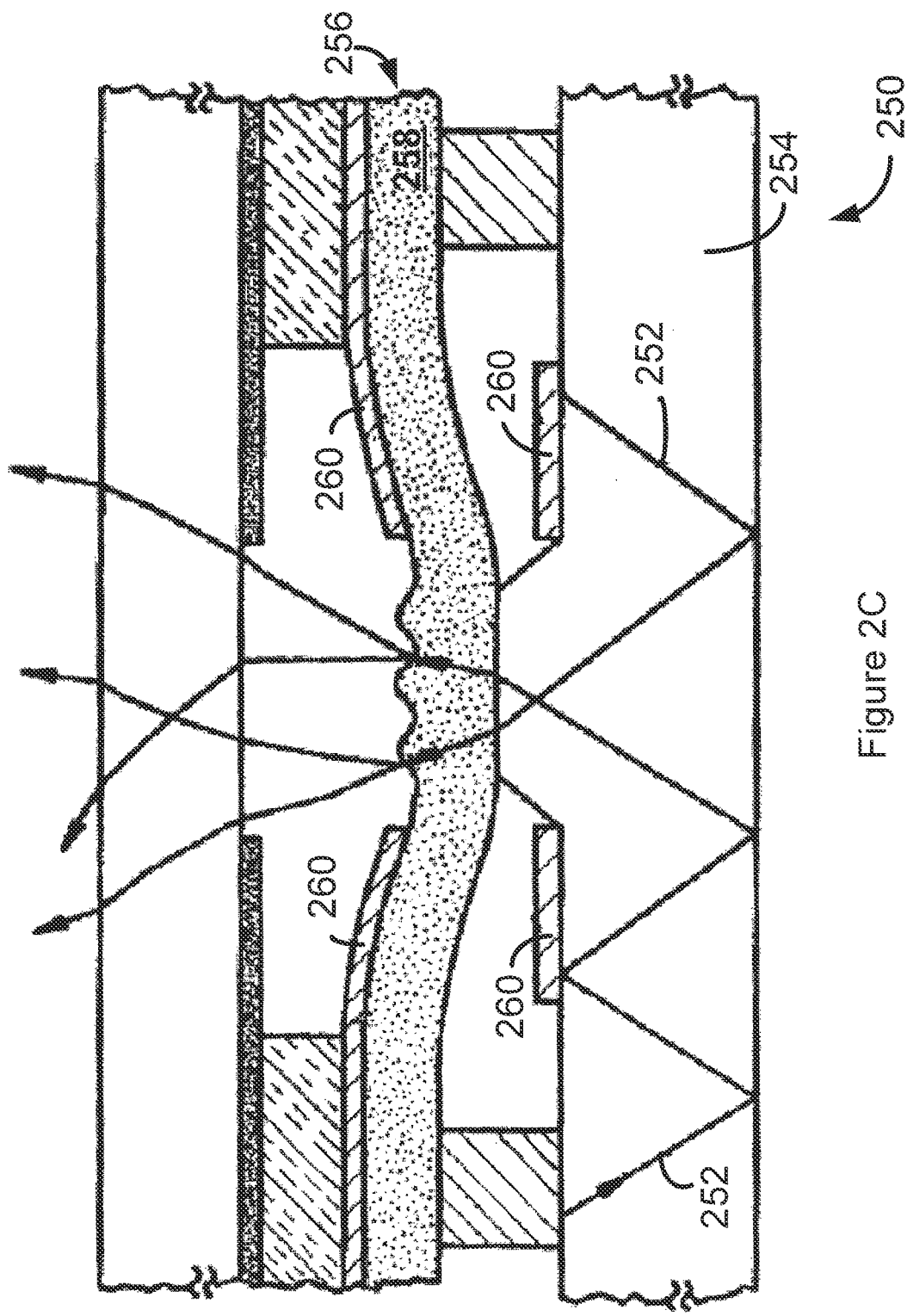
FIG. 2C is a cross sectional view of a light-tap-based light modulator suitable for incorporation into an alternative embodiment of the MEMS-based display of FIG. 1A, according to an illustrative embodiment of the invention.

FIG. 2C is a cross-sectional view of an illustrative non shutter-based MEMS light modulator 250. The light tap modulator 250 is suitable for incorporation into an alternative embodiment of the MEMS-based display apparatus 100 of FIG. 1A, according to an illustrative embodiment of the invention. As described further in U.S. Pat. No. 5,771,321, entitled "Micromechanical Optical Switch and Flat Panel Display," the entirety of which is incorporated herein by reference, a light tap works according to a principle of frustrated total internal reflection. That is, light 252 is introduced into a light guide 254, in which, without interference, light 252 is for the most part unable to escape the light guide 254 through its front or rear surfaces due to total internal reflection. The light tap 250 includes a tap element 256 that has a sufficiently high index of refraction that, in response to the tap element 256 contacting the light guide 254, light 252 impinging on the surface of the light guide 254 adjacent the tap element 256 escapes the light guide 254 through the tap element 256 towards a viewer, thereby contributing to the formation of an image.

In one embodiment, the tap element 256 is formed as part of beam 258 of flexible, transparent material. Electrodes 260 coat portions of one side of the beam 258. Opposing electrodes 260 are disposed on the light guide 254. By applying a voltage across the electrodes 260, the position of the tap element 256 relative to the light guide 254 can be controlled to selectively extract light 252 from the light guide 254.

Figure 2D:
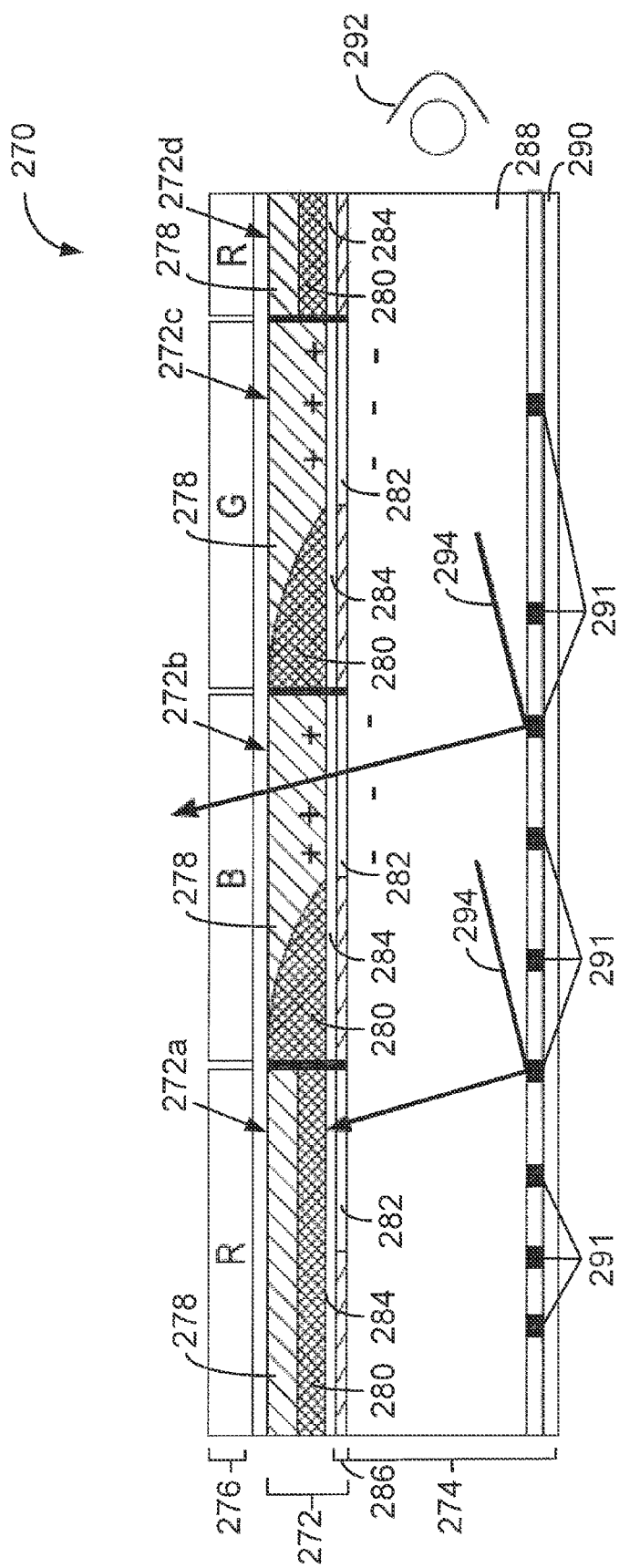
FIG. 2D is a cross sectional view of an electrowetting-based light modulator suitable for incorporation into an alternative embodiment of the MEMS-based display of FIG. 1A, according to an illustrative embodiment of the invention.

FIG. 2D is a cross sectional view of a second illustrative non-shutter-based MEMS light modulator suitable for inclusion in various embodiments of the invention. Specifically, FIG. 2D is a cross sectional view of an electrowetting-based light modulation array 270. The electrowetting-based light modulator array 270 is suitable for incorporation into an alternative embodiment of the MEMS-based display apparatus 100 of FIG. 1A, according to an illustrative embodiment of the invention. The light modulation array 270 includes a plurality of electrowetting-based light modulation cells 272a-272d (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide) and an insulating layer 284 positioned between the layer of light absorbing oil 280 and the transparent electrode 282. Illustrative implementations of such cells are described further in U.S. Patent Application Publication No. 2005/0104804, published May 19, 2005 and entitled "Display Device." In the embodiment described herein, the electrode takes up a portion of a rear surface of a cell 272.

The light modulation array 270 also includes a light guide 288 and one or more light sources 292 which inject light 294 into the light guide 288. A series of light redirectors 291 are formed on the rear surface of the light guide, proximate a front facing reflective layer 290. The light redirectors 291 may be either diffuse or specular reflectors. The modulation array 270 includes an aperture layer 286 which is patterned into a series of apertures, one aperture for each of the cells 272, to allow light rays 294 to pass through the cells 272 and toward the viewer.

In one embodiment the aperture layer 286 is comprised of a light absorbing material to block the passage of light except through the patterned apertures. In another embodiment the aperture layer 286 is comprised of a reflective material which reflects light not passing through the surface apertures back towards the rear of the light guide 288. After returning to the light guide, the reflected light can be further recycled by the front facing reflective layer 290.

In operation, application of a voltage to the electrode 282 of a cell causes the light absorbing oil 280 in the cell to move into or collect in one portion of the cell 272. As a result, the light absorbing oil 280 no longer obstructs the passage of light through the aperture formed in the reflective aperture layer 286 (see, for example, cells 272b and 272c). Light escaping the light guide 288 at the aperture is then able to escape through the cell and through a corresponding color (for example, red, green, or blue) filter in the set of color filters 276 to form a color pixel in an image. When the electrode 282 is grounded, the light absorbing oil 280 returns to its previous position (as in cell 272a) and covers the aperture in the reflective aperture layer 286, absorbing any light 294 attempting to pass through it.

The roller-based light modulator 220, light tap 250, and electrowetting-based light modulation array 270 are not the only examples of MEMS light modulators suitable for inclusion in various embodiments of the invention. It will be understood that other MEMS light modulators can exist and can be usefully incorporated into the invention.

U.S. Pat. No. 7,271,945 and U.S. patent application Ser. No. 11/326,696 have described a variety of methods by which an array of shutters can be controlled via a control matrix to produce images, in many cases moving images, with appropriate gray scale. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve either the speed, the gray scale and/or the power dissipation performance of the display.

Figure 3A:
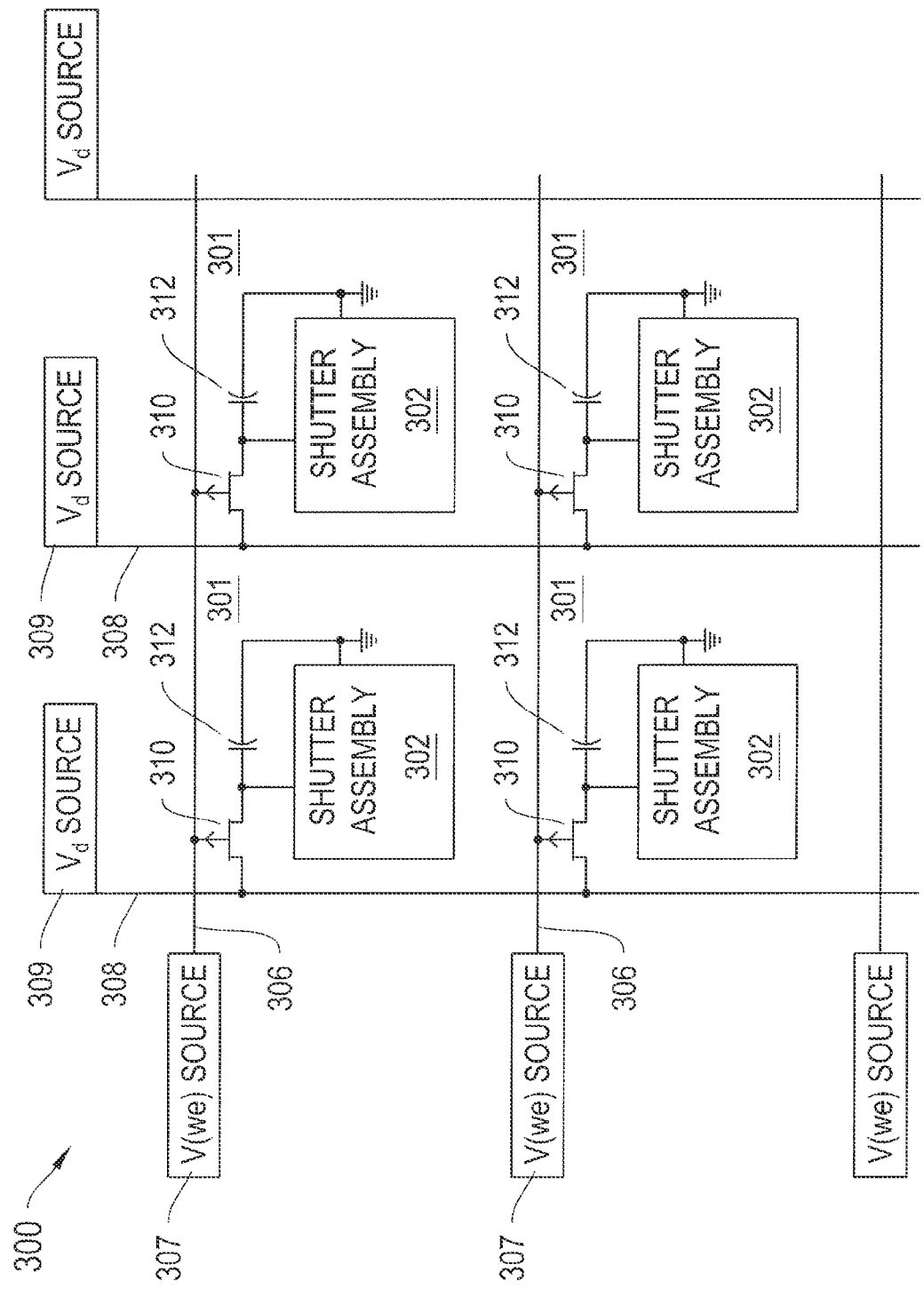
FIG. 3A is a schematic diagram of a control matrix suitable for controlling the light modulators incorporated into the MEMS-based display of FIG. 1A, according to an illustrative embodiment of the invention.
Figure 3B:
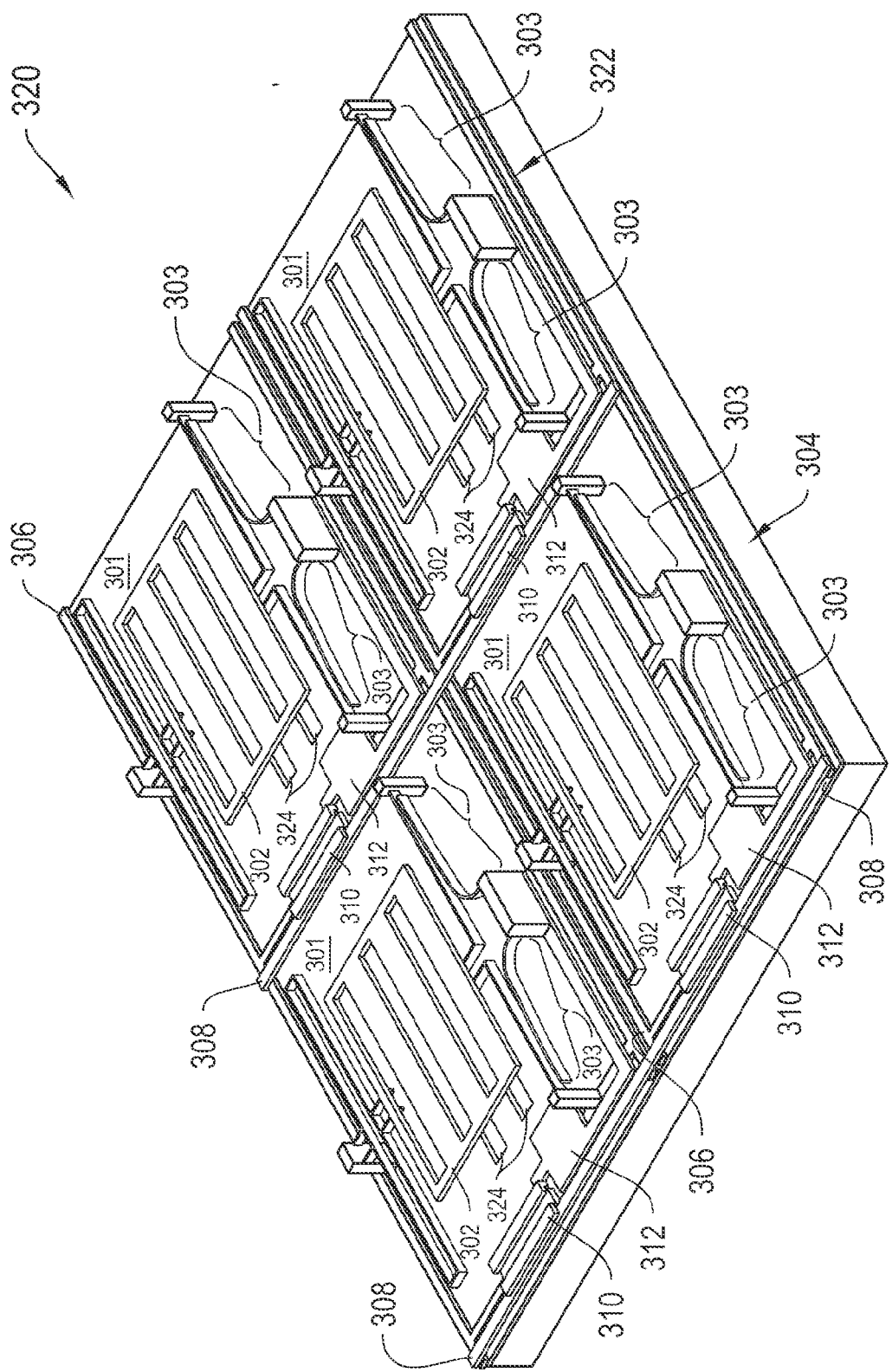
FIG. 3B is a perspective view of an array of shutter-based light modulators connected to the control matrix of FIG. 3A, according to an illustrative embodiment of the invention.

FIG. 3A is a schematic diagram of a control matrix 300 suitable for controlling the light modulators incorporated into the MEMS-based display apparatus 100 of FIG. 1A, according to an illustrative embodiment of the invention. FIG. 3B is a perspective view of an array 320 of shutter-based light modulators connected to the control matrix 300 of FIG. 3A, according to an illustrative embodiment of the invention. The control matrix 300 may address an array of pixels 320 (the "array 320"). Each pixel 301 includes an elastic shutter assembly 302, such as the shutter assembly 200 of FIG. 2A, controlled by an actuator 303. Each pixel also includes an aperture layer 322 that includes apertures 324. Further electrical and mechanical descriptions of shutter assemblies such as shutter assembly 302, and variations thereon, can be found in U.S. Pat. No. 7,271,945 and U.S. patent application Ser. No. 11/326,696. Descriptions of alternate control matrices can also be found in U.S. patent application Ser. No. 11/607,715.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source, ("Vd source") 309 to the pixels 301 in a corresponding column of pixels 301. In control matrix 300, the data voltage $V_d$ provides the majority of the energy necessary for actuation of the shutter assemblies 302. Thus, the data voltage source 309 also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly 302 actuates, opening the shutter in that shutter assembly 302. The voltage applied to the data interconnect 308 remains stored in the capacitor 312 of the pixel 301 even after the control matrix 300 ceases to apply $V_{we}$ to a row. It is not necessary, therefore, to wait and hold the voltage $V_{we}$ on a row for times long enough for the shutter assembly 302 to actuate; such actuation can proceed after the write-enabling voltage has been removed from the row. The capacitors 312 also function as memory elements within the array 320, storing actuation instructions for periods as long as is necessary for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In one implementation the substrate 304 is made of a transparent material, such as glass or plastic. In another implementation the substrate 304 is made of an opaque material, but in which holes are etched to form the apertures 324.

Components of shutter assemblies 302 are processed either at the same time as the control matrix 300 or in subsequent processing steps on the same substrate. The electrical components in control matrix 300 are fabricated using many thin film techniques in common with the manufacture of thin film transistor arrays for liquid crystal displays. Available techniques are described in Den Boer, *Active Matrix Liquid Crystal Displays* (Elsevier, Amsterdam, 2005), incorporated herein by reference. The shutter assemblies are fabricated using techniques similar to the art of micromachining or from the manufacture of micromechanical (i.e., MEMS) devices. Many applicable thin film MEMS techniques are described in Rai-Choudhury, ed., Handbook of Microlithography, Micromachining & Microfabrication (SPIE Optical Engineering Press, Bellingham, Wash. 1997), incorporated herein by reference. Fabrication techniques specific to MEMS light modulators formed on glass substrates can be found in U.S. patent application Ser. Nos. 11/361,785 and 11/731,628, which are incorporated herein by reference in their entirety. For instance, as described in those applications, the shutter assembly 302 can be formed from thin films of amorphous silicon, deposited by a chemical vapor deposition process.

The shutter assembly 302 together with the actuator 303 can be made bi-stable. That is, the shutters can exist in at least two equilibrium positions (e.g. open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 can also be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in shutter-based light modulator 200, or the opposing force may be exerted by an opposing actuator, such as an "open" or "closed" actuator.

The light modulator array 320 is depicted as having a single MEMS light modulator per pixel. Other embodiments are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

In other embodiments, the roller-based light modulator 220, the light tap 250, or the electrowetting-based light modulation array 270, as well as other MEMS-based light modulators, can be substituted for the shutter assembly 302 within the light modulator array 320.

Figure 4A:
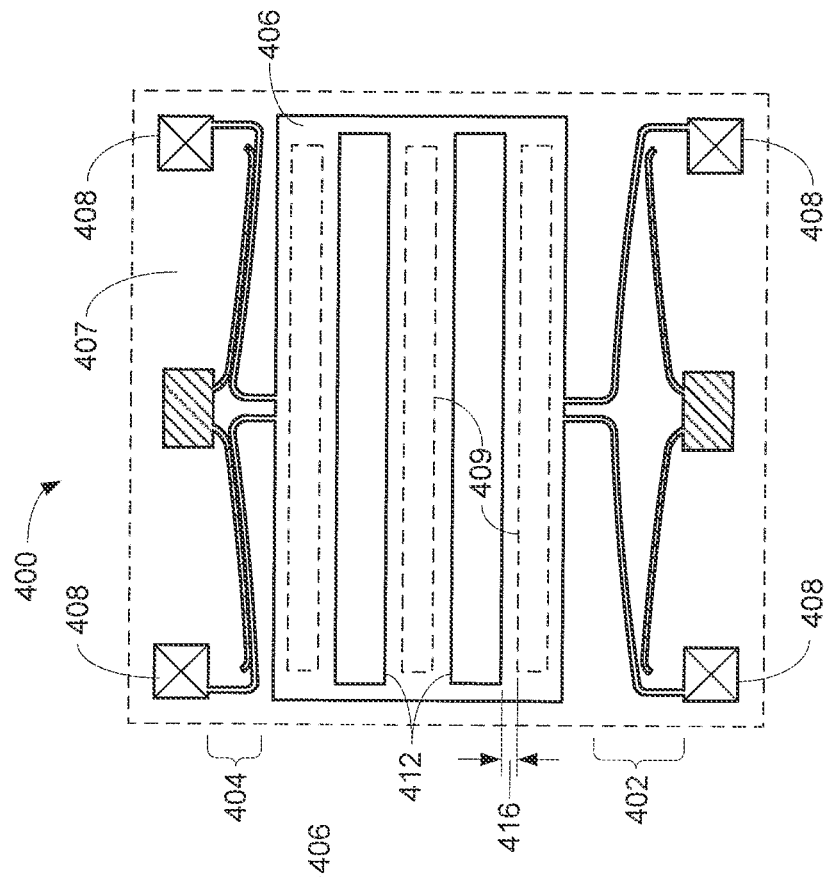
FIGS. 4A and 4B are plan views of a dual-actuated shutter assembly in the open and closed states respectively, according to an illustrative embodiment of the invention.
Figure 4B:
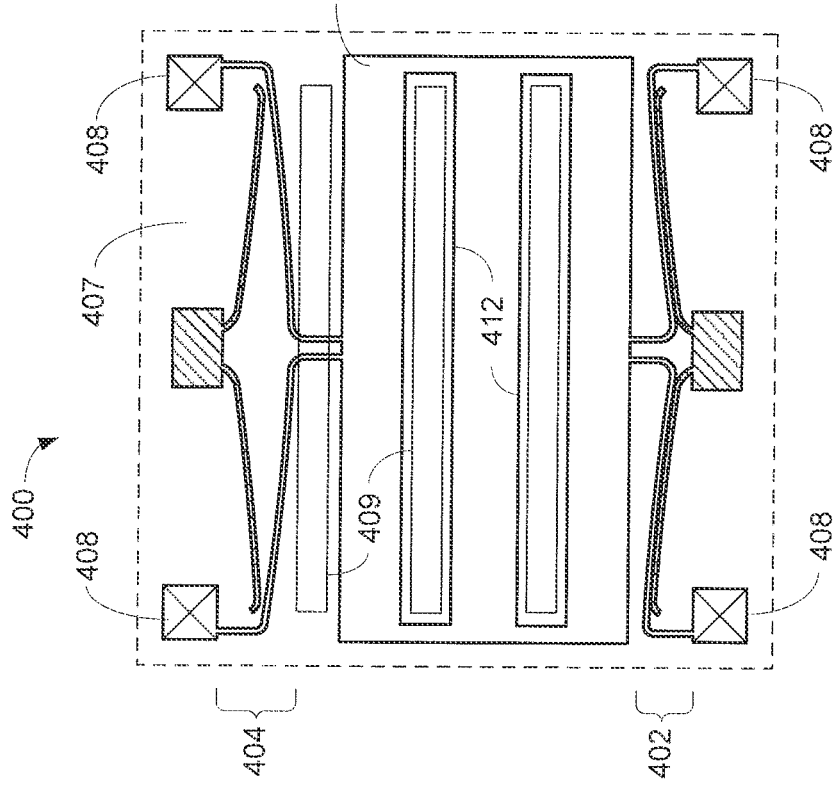

FIGS. 4A and 4B illustrate an alternative shutter-based light modulator (shutter assembly) 400 suitable for inclusion in various embodiments of the invention. The light modulator 400 is an example of a dual actuator shutter assembly, and is shown in FIG. 4A in an open state. FIG. 4B is a view of the dual actuator shutter assembly 400 in a closed state. Shutter assembly 400 is described in further detail in U.S. patent application Ser. No. 11/251,035, referenced above. In contrast to the shutter assembly 200, shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially a plane parallel to the substrate. By analogy to the control matrix 300 of FIG. 3A, a control matrix suitable for use with shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of apertures 412 and 409 coincide. In FIG. 4B the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (shown as dotted lines). Each aperture has at least one edge around its periphery. For example, the rectangular apertures 409 have four edges. In alternative implementations in which circular, elliptical, oval, or other curved apertures are formed in the aperture layer 407, each aperture may have only a single edge. In other implementations the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage—displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 4C:
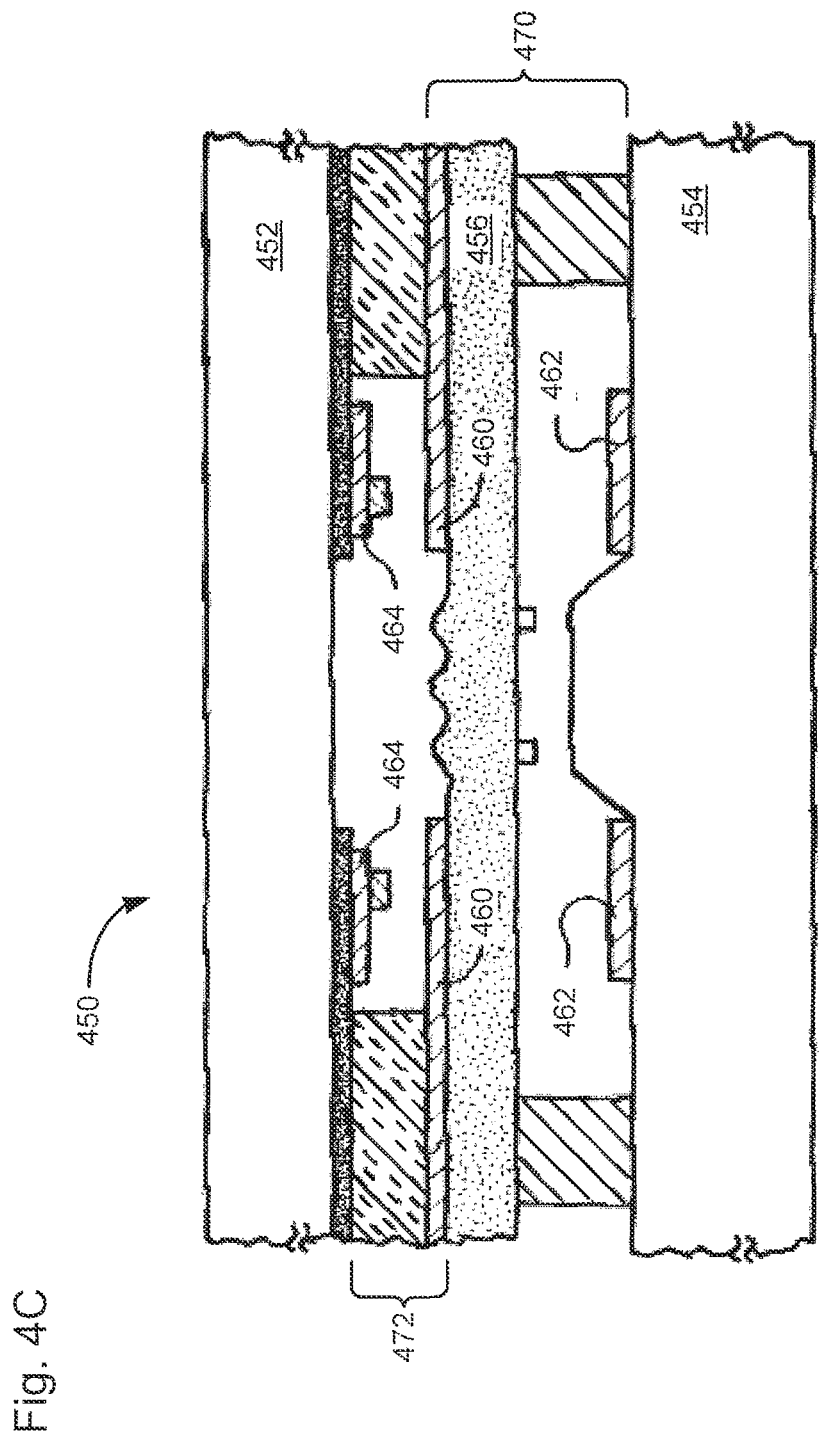
FIG. 4C is a cross sectional view of a dual actuator light tap-based light modulator suitable for incorporation into the MEMS-based display, according to an illustrative embodiment of the invention.

FIG. 4C is a cross-sectional view of a non shutter-based MEMS light modulator 450, which includes first and second opposing actuators. The light modulator 450 is also referred to as a dual actuator light tap, which operates according to the principle of frustrated total internal reflection. The dual actuator light tap is a variation of light tap modulator 250 as described in U.S. Pat. No. 5,771,321, referred to above. The dual actuator light tap 450 comprises a light guide 454, in which, without interference, light is for the most part unable to escape through its front or rear surfaces due to total internal reflection. The light tap 450 also includes a cover sheet 452 and a flexible membrane or tap element 456. The tap element 456 has a sufficiently high index of refraction such that, in response to the tap element 456 contacting the light guide 454, light impinging on the surface of the light guide 454 adjacent the tap element 456 escapes the light guide 454 through the tap element 456 towards a viewer, thereby contributing to the formation of an image.

The tap element 456 is formed from a flexible transparent material. Electrodes 460 are coupled to the tap element 456. The light tap 450 also includes electrodes 462 and 464. The combination of electrodes 460 and 462 comprise a first actuator 470 and the combination of electrodes 460 and 464 comprise a second opposing actuator 472. By applying a voltage to the first actuator 470 the tap element 456 can be moved toward the light guide 454, allowing light to be extracted from the light guide 454. By applying a voltage to the second actuator 472 the tap element can be moved away from the light guide 454 thereby restricting the extraction of light from the light guide 454.

The actuators 470 and 472 are designed so that their voltage—displacement behavior provides an electrically bi-stable characteristic to the light tap 450. For each of the first and second actuators there exists a range of voltages below the actuation voltage, which if applied while that actuator is in the closed state, will hold the actuator closed and the tap element in position, even after an actuation voltage is applied to the opposing actuator. The minimum voltage needed to maintain the tap element's position against such an opposing force is referred to as a maintenance voltage $V_m$.

Electrical bi-stability arises from the fact that the electrostatic force across an actuator is a strong function of position as well as voltage. The beams of the actuators in the light modulators 400 and 450 act as capacitor plates. The force between capacitor plates is proportional to $1/d^2$ where d is the local separation distance between capacitor plates. In a closed actuator, the local separation between actuator beams is very small. Thus, the application of a small voltage can result in a relatively strong force between the actuator beams of a closed actuator. As a result, a relatively small voltage, such as $V_m$, can keep the actuator closed, even if other elements exert an opposing force on the closed actuator.

In light modulators, such as 400 and 450, that provide two opposing actuators (e.g. for the purpose of opening and closing a shutter respectively), the equilibrium position of the modulator will be determined by the combined effect of the voltage differences across each of the actuators. In other words, the electrical potentials of all three terminals (e.g. the shutter open drive beam, the shutter close drive beam, and the shutter/load beams), as well as modulator position, must be considered to determine the equilibrium forces on the modulator.

For an electrically bi-stable system, a set of logic rules can describe the stable states and can be used to develop reliable addressing or digital control schemes for the modulator. Referring to the shutter-based light modulator 400 as an example, these logic rules are as follows:

Let $V_s$ be the electrical potential on the shutter or load beam. Let $V_o$ be the electrical potential on the shutter-open drive beam. Let $V_c$ be the electrical potential on the shutter-close drive beam. Let the expression $/V_o-V_s/$ refer to the absolute value of the voltage difference between the shutter and the shutter-open drive beam. Let $V_m$ be the maintenance voltage. Let $V_{at}$ be the actuation threshold voltage, i.e., the voltage necessary to actuate an actuator absent the application of $V_m$ to an opposing drive beam. Let $V_{max}$ be the maximum allowable potential for $V_o$ and $V_c$. Let $V_m < V_{at} < V_{max}$. Then, assuming $V_o$ and $V_c$ remain below $V_{max}$:

1. If $|V_o - V_s| < V_m$ and $|V_c - V_s| < V_m$

Then the shutter will relax to the equilibrium position of its mechanical spring.

2. If $|V_o - V_s| > V_m$ and $|V_c - V_s| > V_m$

Then the shutter will not move, i.e. it will hold in either the open or the closed state, whichever position was established by the last actuation event.

3. If $|V_o - V_s| > V_{at}$ and $|V_c - V_s| < V_m$

Then the shutter will move into the open position.

4. If $|V_o - V_s| < V_m$ and $|V_c - V_s| > V_{at}$

Then the shutter will move into the closed position.

Following rule 1, with voltage differences on each actuator near to zero, the shutter will relax. In many shutter assemblies the mechanically relaxed position is only partially open or closed, and so this voltage condition is preferably avoided in an addressing scheme.

The condition of rule 2 makes it possible to include a global actuation function into an addressing scheme. By maintaining a shutter voltage which provides beam voltage differences that are at least the maintenance voltage, $V_m$, the absolute values of the shutter open and shutter closed potentials can be altered or switched in the midst of an addressing sequence over wide voltage ranges (even where voltage differences exceed $V_{at}$) with no danger of unintentional shutter motion.

The conditions of rules 3 and 4 are those that are generally targeted during the addressing sequence to ensure the bi-stable actuation of the shutter.

The maintenance voltage difference, $V_m$, can be designed or expressed as a certain fraction of the actuation threshold voltage, $V_{at}$. For systems designed for a useful degree of bi-stability the maintenance voltage can exist in a range between 20% and 80% of $V_{at}$. This helps ensure that charge leakage or parasitic voltage fluctuations in the system do not result in a deviation of a set holding voltage out of its maintenance range—a deviation which could result in the unintentional actuation of a shutter. In some systems an exceptional degree of bi-stability or hysteresis can be provided, with $V_m$ existing over a range of 2% to 98% of $V_{at}$. In these systems, however, care must be taken to ensure that an electrode voltage condition of $V < V_m$ can be reliably obtained within the addressing and actuation time available.

Figure 5A:
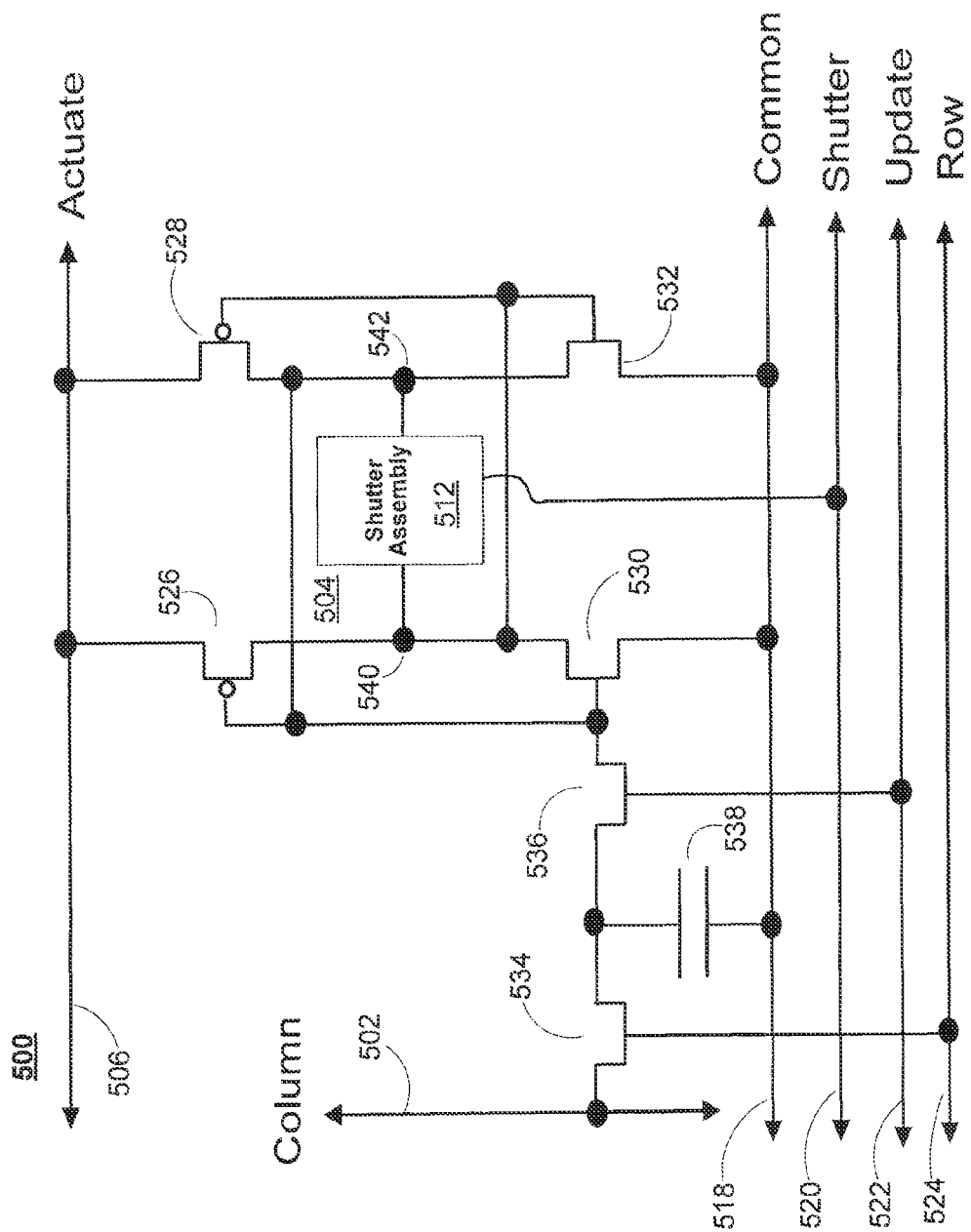
FIG. 5A is a diagram of a control matrix suitable for controlling the shutter assemblies of the display apparatus of FIG. 1A, according to an illustrative embodiment of the invention.

FIG. 5A illustrates an alternative control matrix 500, suitable for inclusion in the display apparatus 100, according to an illustrative embodiment of the invention. Control matrix 500 controls an array of pixels 504 that include dual-actuator shutter assemblies 512. Dual actuator shutter assemblies, such as shutter assembly 400, are shutter assemblies that include separate shutter-open and shutter-close actuators. Although only one pixel 504 is illustrated in FIG. 5A, it is understood that the control matrix extends and incorporates a large number of rows and columns of similar pixels, as is partially illustrated by the control matrix 300 of FIG. 3A. In addition, the control matrix may be used with any suitable type of display modulator. The MEMS modulators and actuators, such as dual and single-actuator modulators, and non-shutter based modulators, and modulators 200, 220, 250, 270, 400 and 450 are particular examples that fall within the scope of the invention. Displays based upon liquid crystal modulators or plasma emission also fall within the scope of this invention.

The control matrix 500 includes column line interconnect 502 for each column of pixels 504 in the control matrix. The actuators in the shutter assemblies 504 can be made either electrically bi-stable or mechanically bi-stable. The light control matrix 500 is depicted as having a single MEMS light modulator per pixel. Other embodiments are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures, which are associated with each of the light modulators, have unequal areas.

The control matrix 500 includes a plurality of lines, herein referred to as "global lines" common to the entire display, composed of a plurality of identical pixels arranged in a row and column fashion. These global lines include the actuate line interconnect 506 the common line interconnect 518, the shutter line interconnect 520, and the update line interconnect 522 In some embodiments these global lines are operated as one node across the entire display. For example, the entire update node across the display, or the entire actuate node across the display is changed at the same time. In some embodiments, these global line interconnects can be grouped into pixel sub-groups. For example, each odd row of pixels may have their global lines connected, and each even row of pixels' global lines may be separately connected so that odd rows may be operated independently of even rows. The control matrix 500 includes a row line, 524, unique to each row arrangement of pixels and a column line, 502, unique to each column arrangement of pixels. Each pixel 504 in the control matrix includes a data loading transistor 534, a data store capacitor 538, an update transistor 536, actuator nodes 540 and 542, and a dual inverter latch. In control matrix 500, the data store capacitor 538 is connected to the common line interconnect 518. However, in some embodiments the data store capacitor 538 may be connected to the shutter line interconnect 520. In some embodiments, the common line interconnect 518 can serve as the next row's row interconnect 524, and therefore eliminating the common line interconnect 518 altogether.

The dual inverter latch includes a first inverter comprised of transistors 526 and 530, and a second inverter comprised of transistors 528 and 532. Shutter assemblies 512 include electrostatic actuators, similar to actuator 204 of shutter assembly 200, connected to the actuator nodes 540 and 542. When a voltage difference equal to or greater than an actuation voltage, also referred to as a charging voltage or $V_{at}$, is imposed between the actuators and the shutter, the shutter assembly can be driven into an open state allowing passage of light, or a closed state, blocking the passage of light. The control matrix 500 makes use of two complementary types of transistors: both p-channel and n-channel transistors. It is therefore referred to as a complementary MOS control matrix or a CMOS control matrix. While the data loading transistor 534, update transistor 536 and the lower transistors of the cross-coupled inverters 530 and 532 are made of the nMOS type, the upper transistors of the cross-coupled inverter 526 and 528 are made of the pMOS type of transistor. Those of skill in the art will recognize that in other implementations, the types of CMOS transistors can be reversed (i.e., pMOS switched with nMOS), or other types of transistors may be used (i.e., BJT, JFET or any other suitable type of transistor).

In some embodiments, actuate line 506 is connected to a voltage source that is maintained equal to or greater than $V_{at}$. The shutter line 520 is maintained near to the ground potential. In some embodiments, the shutter polarity may be maintained at the full actuation voltage (i.e., approximately 25 volts). In certain embodiments, the polarity of the shutter may be periodically alternated between one or more potentials as necessary. For example, the shutter may be alternated between 25 volts and 0 volts after each full video frame, or in other cases, more or less frequently. The shutter polarity may be controlled by applying the necessary voltage to the shutter line interconnect 520. In some embodiments, the polarity of the data is alternated, as well, corresponding to the shutter potential being alternated.

Each actuator node 540 and 542 is connected to actuate line 506 depending on the "on/off" state of its respective transistor 526 and 528. For example, when the transistor 526 connected to the left actuator node 540 is in an "on" state, charge is allowed to flow from the actuate line 506 to the actuator node 540. Then, a voltage of approximately $V_{at}$ will be imposed between the actuator connected to the actuator node 540 and the shutter (assuming the shutter is at common potential), and the shutter will be driven into its desired state. A similar process occurs when transistor 526 is in an "off" state and transistor 528 is in an "on" state, which results in driving the shutter into the opposite state. In some embodiments, a voltage of approximately $V_{at}$ will be applied to the actuator connected to the actuator node 540 and a similar voltage applied to the shutter, thereby creating a 0 volt potential between the shutter and actuator.

The control matrix 500 includes a data store capacitor 538. As described further below, the capacitor 538 stores, by means of stored charge, "data" instructions (e.g., open or close) that are sent by a controller, such as controller 156, to the pixel 504 as part of a data loading or writing operation. The voltage stored on the capacitor 538 determines, in part, the latch state of the dual inverter latch in control matrix 500.

During a data load operation, each row of the array is write-enabled in an addressing sequence. The voltage sources in control matrix 500 (not shown) apply a write-enabling voltage to the row line interconnect 524 corresponding to a selected row. The application of voltage to the row line interconnect 524 for the write-enabled row turns on the data-loading transistor 534 of the pixels 504 in the corresponding row line, thereby write enabling the pixels. While a selected row of pixels 504 is write-enabled, data voltage sources apply appropriate data voltages to the column interconnect 502 corresponding to each column of pixels 504 in the control matrix 500. The voltages applied to the column interconnects 502 are thereby stored on the data store capacitors 538 of the respective pixels 504. In certain embodiments, the voltages applied to column interconnect 502 may be negative or positive (e.g., ranging from −5 to 5 volts).

Figure 5B:
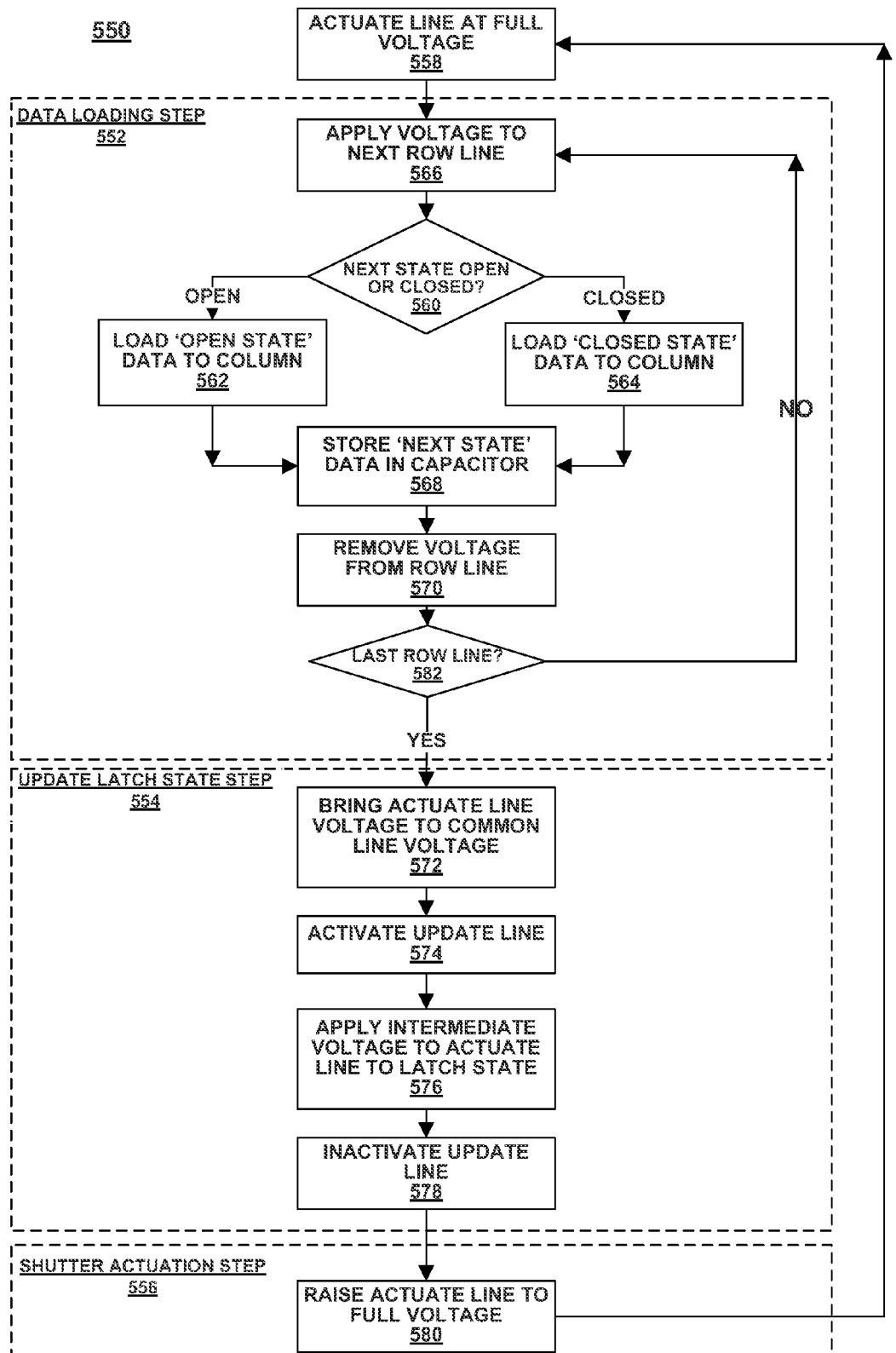
FIG. 5B is a flow chart of a method of addressing the pixels of the control matrix of FIG. 5A, according to an illustrative embodiment of the invention.

A method of addressing pixels in control matrix 500 is illustrated by the method 550 shown in FIG. 5B. The method 550 proceeds in three general steps. First, data is loaded row by row to each pixel in the data loading step 552. Next, the latch for each pixel is set to the correct state based, at least in part, on the stored data in the update latch state step 554. Finally, the shutters are actuated in the shutter actuation step 556.

In more detail, the frame addressing cycle of method 550 begins in a held data state with the actuate line 506 at the full voltage $V_{at}$ needed to reliably actuate the shutter to the appropriate actuator node (Step 558). For example this voltage may be approximately 20-30 volts. The control matrix 500 then proceeds with the data loading step 552 by addressing each pixel 504 in the control matrix, one row at a time (steps 556-570). To address a particular row, the control matrix 500 write-enables a first row line by applying a voltage to the corresponding row-line interconnect 524 (step 566), effectively switching the data loading transistor 534 to a conductive "on" state. Then, at decision block 560, the control matrix 500 determines for each pixel 504 in the write-enabled row whether the pixel 504 needs to be open or closed in the next state. For example, at step 560 it is determined for each pixel 504 in the write-enabled row whether or not the pixel is to be (subsequently) changed from its current state or kept the same. If a pixel 504 is to be opened, the control matrix 500 loads a particular data voltage $V_d$, for example 1.5V, to the column interconnect 502 corresponding to the column in which that pixel 504 is located (step 562). If a pixel 504 is to be closed, the control matrix 500 loads a particular data voltage $V_d$, for example −1.5V, to the column interconnect 502 corresponding to the column in which that pixel 504 is located (step 564). The data voltage $V_d$ applied to the column interconnect 502, corresponding to the next state of the shutter, is then stored by means of a charge on the data store capacitor 538 of the selected pixel 504 (step 568). Next, the voltage is removed from the row line 524 (step 570), effectively switching the data loading transistor 534 to a non-conducting "off" state. Once data loading transistor 534 is set to the "off" state, column line 502 is ready to load the data voltage $V_d$ for the a pixel in the next selected row.

The data voltage $V_d$ can be set at any time as long as it is valid when the row line 524 is turned off, so that the correct data is on the data storage capacitor 538 when data loading transistor 534 becomes non conductive. During the data loading step 552, the update line 522 is inactive, thereby isolating the data storage capacitor 538 from the current state held by the transistors 526-532 of the cross-coupled inverter latch.

The application of $V_{we}$ to the scan-line interconnect 524 for the write-enabled row turns on all of the write-enable transistors 534 for the pixels 512 in the corresponding scan line. The control matrix 500 selectively applies the data voltage to all columns of a given row in the control matrix 500 at the same time while that row has been write-enabled. After all data has been stored on capacitors 538 in the selected row (steps 560 to 568), the control matrix 500 grounds the selected scan-line interconnect (step 570) and selects a subsequent scan-line interconnect for writing. Control over the data loading process then returns to step 566 for the write-enabling of the next selected row. After the information has been stored in the capacitors for all the rows in control matrix 500, the decision block 582 is triggered to proceed to the global update sequence.

After data has been stored on capacitors 538 in the selected rows in data loading step 552 (steps 566-570), the control matrix 500 then proceeds with the update latch step 554 to update portions or banks of the pixels, or the entire display to the next held state. The update latch sequence begins at step 572 of method 550 by bringing the voltage on the actuate line 506 down, or close, to the voltage on the common line 518. This brings the voltages on both the actuator nodes 540 and 542 close to the same voltage as the common line 518. Next, the update line 522 is activated in step 574, thereby switching the update transistor 536 to a conductive "on" state and allowing the stored data to be passed from the data store capacitor 538 to the transistors 526-532 of the cross-coupled inverter latch. If the update line 522 is activated (step 574) too early after the actuate line 506 voltage is brought to the common line 518 voltage (step 572), the stored next state of the next state data can be corrupted by present state data of the latch that has not had enough time to decay away. This necessary non-overlap timing can be a function of circuit parasitics, transistor threshold voltages, capacitor size and stored data voltage levels. For example, the delay needed between steps 572 and 574 may be approximately 10 μs, however this delay time may be considerably longer or shorter depending on the display.

An intermediate voltage just high enough to make the latch transistors operate (e.g. approximately equal to the sum of the threshold voltages of the inverter transistors 526 and 530 or 528 and 532. The level can be significantly less, limited by the details of needed timings, parasitic charge injections, detailed transistor characteristics, and the like) is applied to the actuate line 506 in step 576. The intermediate voltage applied to the actuate line 506 in step 576 functions to minimize the power used to latch to the next state. In certain embodiments, the cross-coupled inverter latch is latched at as low an intermediate voltage level as can be reliably performed in order to reduce overall transient switching power. Steps 574 and 576 cause the data stored on data store capacitor 538 to be latched in the cross-coupled inverter latch of pixel 504.

Step 576 may be performed simultaneously to, before or after activating the update line 522 in step 574. For example, in certain embodiments, applying an intermediate voltage to the actuate line 506 in step 576 can be done completely after the update pulse created in steps 574 and 578 or the intermediate voltage pulse created in step 576 can partially or fully overlap with the update voltage pulse. In some embodiments, control of the next state of the cross-coupled inverter latch is executed by overlap of the two states, particularly if parasitic capacitances of the data latch are low.

Finally, the update line 522 is inactivated in step 578, thereby switching the update transistor 536 to a non-conductive "off" state and isolating the data store capacitor 538 from the cross-coupled inverter latch of pixel 504. By inactivating the update line 522 (step 578) before raising the actuate line to full voltage (step 580) significant power is conserved by not allowing the data storage capacitor 538 to be charged to the full actuation voltage.

On the other hand, it is possible to not have the update transistor, 536, at all. In this case the data loading operation would directly change the latch state as it is loaded row by row. This could happen by simultaneously lowering the actuate node to the appropriate intermediate level or to approximately 0 then to the intermediate level on a row by row basis as well to allow for lower data voltages to determine the latch state, or by lowering the actuate node for the entire display to an appropriate intermediate level during the entire data loading operation, or, if power is not a concern, or the actuation voltages are low enough to make the power a secondary concern, the data voltages could be at full actuation voltage levels, or more, with the actuate node maintained at the full Vac, to force the latch to the desired state. Also, by eliminating update transistor 536, layout area may be saved.

Once the data has been transferred and the latch state updated in step 554, the control matrix 500 proceeds with the shutter actuation step 556 to move the shutters, of shutter assemblies 512, to their next state. Shutter actuation step 556 includes raising the actuate line 506 to full voltage in step 580. Full voltage may be the voltage necessary to actuate the shutter to one side or the other and to hold the shutter in that position until the next frame addressing cycle. Because the latch state was set earlier during the update latch state step 554, there is no conduction path from the actuate line 506 through the two transistors in series in each inverter (526 and 530 or 528 and 532). Thus, only current meant to charge the actuation of the shutter capacitance and various parasitic capacitance is allowed to flow, resulting in minimal power dissipation. After the shutters are actuated in step 556, method 550 returns to the beginning of the pixel addressing cycle.

The action of the cross coupled inverter latch in control matrix 500 requires only one shutter transition time to get to its next state. Previous methods of display control require two shutter transition times to fully update the entire display. This difference of time for the extra shutter transition can be significant for more complicated display algorithms where many display updates are done in one video frame time. Additionally, control matrix 500 creates a held data state where only one actuator is attractive to the shutter and the other actuator is not attractive. This helps to prevent erroneous shutter states.

In certain embodiments, it is possible to approximate the dual voltage level actuate operation to reduce latching transients in the cross-coupled inverter latch by slewing the actuate line 506 voltage slow enough that the latching operation of the cross coupled inverter latch happens at a low voltage, thus saving power. The timing of the update signal relative to the actuate node voltage level allows for control of excessive charging of the data storage capacitor 538 to assure lower power operation.

Figure 6:
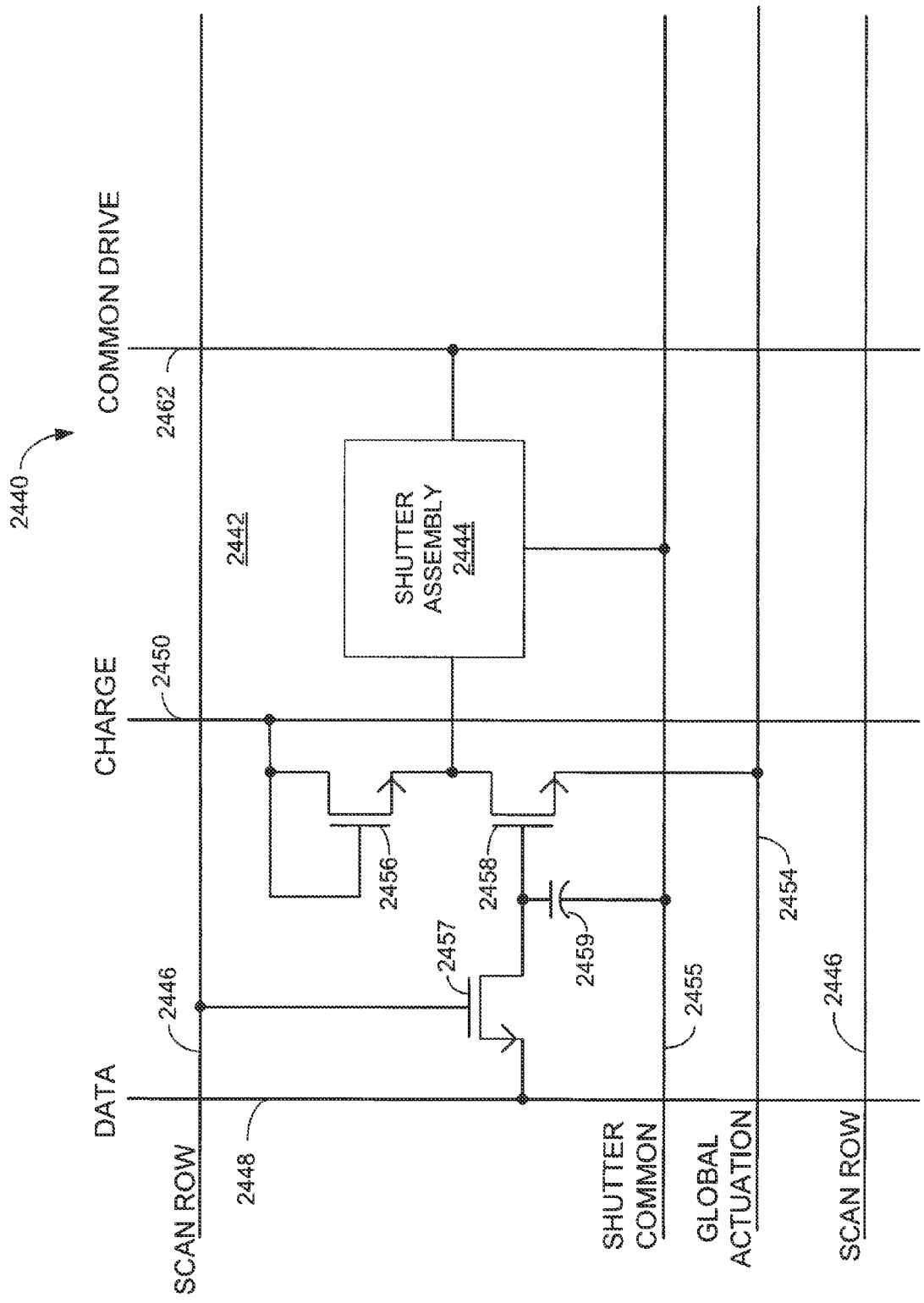
FIG. 6 is a diagram of a control matrix suitable for controlling the shutter assemblies of the display apparatus of FIG. 1A, according to an illustrative embodiment of the invention.

FIG. 6 is yet another suitable control matrix 2440 for inclusion in the display apparatus 100, according to an illustrative embodiment of the invention. Control matrix 2440 controls an array of pixels 2442 that include dual-actuator shutter assemblies 2444 (i.e., shutter assemblies with both shutter-open and shutter-close actuators). The actuators in the shutter assemblies 2444 can be made either electrically bi-stable or mechanically bi-stable.

Control matrix 2440 has similarities with the control matrix 500 in FIG. 5A. Both control matrices utilize a single column line interconnect, a single data load transistor, and a single data store capacitor, despite their use with a dual-actuator shutter assembly. Instead of a dual inverter latch, however, the control matrix 2440 comprises a common drive interconnect 2462 for use in actuation of the shutter assembly. For the example given in control matrix 2440, the common drive interconnect 2462 is electrically connected to the shutter-open actuator of the shutter assembly 2444.

The actuators in the shutter assemblies 2444 can be made either electrically bi-stable or mechanically bi-stable. However, any type of MEMS shutter and actuator assembly may be employed without departing from the scope of the invention. In addition, the control matrix may be used with other suitable type display modulators. The modulators 200, 220, 250, 270, 400 and 450 may be employed without limitation, as well as liquid crystal and plasma emission modulators.

The control matrix 2440 includes a scan-line interconnect 2446 for each row of pixels 2442 in the control matrix 2440. The control matrix 2440 further includes a charge interconnect 2450, a global actuation interconnect 2454, and a shutter common interconnect 2455. The interconnects 2450, 2454, 2455, and 2462 are shared among pixels 2442 in multiple rows and multiple columns in the array. In one implementation (the one described in more detail below), the interconnects 2450, 2454, 2455, and 2462 are shared among all pixels 2442 in the control matrix 2440.

Each pixel 2442 in the control matrix includes a shutter charge transistor 2456, a shutter discharge transistor 2458, a shutter write-enable transistor 2457, and a data store capacitor 2459 as described in FIG. 5A. For the example given in control matrix 2440 the drain of the shutter discharge transistor is connected to the shutter-close actuator of the shutter assembly 2444.

By comparison to control matrix 500 of FIG. 5A, the charging transistor 2456 is wired with a different circuit connection to the charge interconnect 2450. Instead of the dual inverter for connecting the shutter to an actuate interconnect, such as interconnect 506, the gate terminals of the charging transistor 2456 are connected directly to the charge interconnect 2450, along with the drain terminal of transistor 2456. In operation, the charging transistor 2456 operates as a diode, which can pass a current in only 1 direction.

Figure 7:
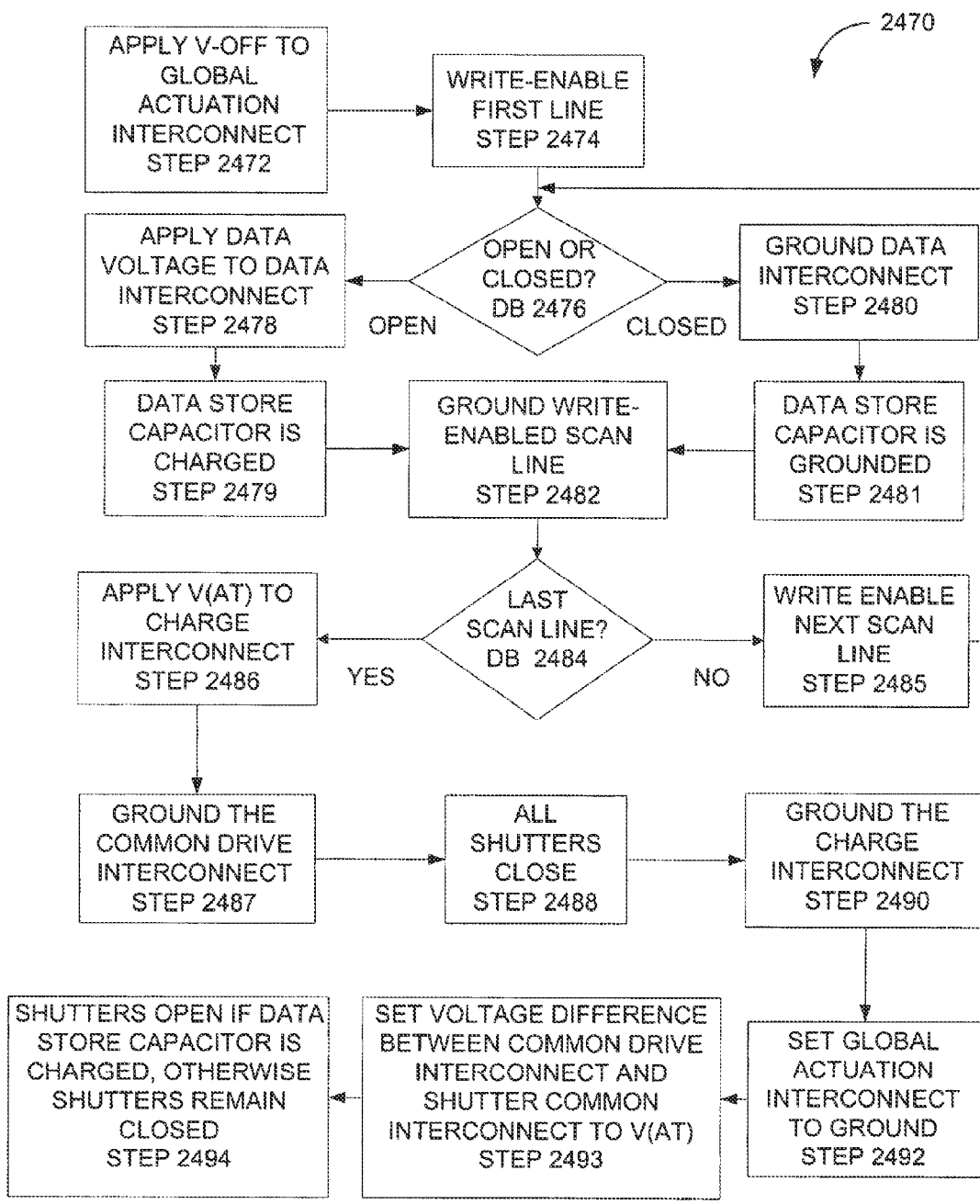
FIG. 7 is a flow chart of a method of addressing the pixels of the control matrix of FIG. 6, according to an illustrative embodiment of the invention.

A method of addressing and actuating the pixels in control matrix 2440 is illustrated by the method 2470 shown in FIG. 7. The method 2470 proceeds in three general steps. First there is a data loading operation, by which the matrix is addressed row by row by storing data into the data store capacitors 2459. In the second general step all of actuators are reset simultaneously at step 2488, in part by applying a voltage $V_{at}$ to the charge interconnect 2450. Step 2488 is sometimes referred to as a first sub-phase of a global update phase. And finally the image is set in steps 2492-2494 by a) selectively activating transistors 2458 by means of the global actuation interconnect 2454 and b) changing the potential difference between the common drive interconnect 2462 and the shutter common interconnect 2455 so as to be greater than an actuation voltage $V_{at}$. The steps 2492-2494 are sometimes referred to as a second sub-phase of a global update phase.

In operation, in order to periodically reverse the polarity of voltages across shutter assemblies 2442, a control matrix advantageously alternates between two control logics. For reasons of clarity, the details for control method 2470 are described next with respect to only the first control logic. In this first control logic the potential of the shutter common interconnect 2455 is maintained at all times near to the ground potential. A shutter will be held in either the open or closed states by applying a voltage $V_{at}$ directly across either or both of the charge interconnect 2450 or the common drive interconnect 2462. (In the second control logic, to be described after we complete the discussion of FIG. 7, the shutter common interconnect is held at the voltage $V_{at}$, and an actuated state will be maintained by maintaining either or both of the charge interconnect 2450 or the common drive interconnect 2462 at ground.)

More specifically for the first control logic of method 2470, the frame addressing cycle of method 2470 begins when a voltage $V_{off}$ is applied to the global actuation interconnect 2454 (step 2472). The voltage $V_{off}$ on interconnect 2454 is designed to ensure that the discharge transistor 2458 will not turn on regardless of whether a voltage has been stored on capacitor 2459.

The control matrix 2440 then proceeds with the data loading operation for each pixel 2442 in the control matrix, one row at a time (steps 2474-2484). To address a particular row, the control matrix 2440 write-enables a first scan line by applying a voltage $V_{we}$ to the corresponding scan-line interconnect 2446 (step 2474). Then, at decision block 2476, the control matrix 2440 determines for each pixel 2442 in the write-enabled row whether the pixel 2442 needs to be open or closed. For example, if at the reset step 2488 all shutters are to be (temporarily) closed, then at decision block 2476 it is determined for each pixel 2442 in the write-enabled row whether or not the pixel is to be (subsequently) opened. If a pixel 2442 is to be opened, the control matrix 2440 applies a data voltage $V_d$, for example 5V, to the data interconnect 2448 corresponding to the column in which that pixel 2442 is located (step 2478). The voltage $V_d$ applied to the data interconnect 2448 is thereby caused to be stored by means of a charge on the data store capacitor 2459 of the selected pixel 2442 (step 2479). If at decision block 2476, it is determined that a pixel 2442 is to be closed, the corresponding data interconnect 2448 is grounded (step 2480). Although the temporary (or reset) position after step 2488 in this example is defined as the shutter-close position, alternative shutter assemblies can be provided in which the reset position after 2488 is a shutter-open position. In these alternative cases, the application of data voltage $V_d$, at step 2478, would result in the opening of the shutter.

The application of $V_{we}$ to the scan-line interconnect 2446 for the write-enabled row turns on all of the write-enable transistors 2457 for the pixels 2442 in the corresponding scan line. The control matrix 2440 selectively applies the data voltage to all columns of a given row in the control matrix 2440 at the same time while that row has been write-enabled. After all data has been stored on capacitors 2459 in the selected row (steps 2479 and 2481), the control matrix 2440 grounds the selected scan-line interconnect (step 2482) and selects a subsequent scan-line interconnect for writing (step 2485). After the information has been stored in the capacitors for all the rows in control matrix 2440, the decision block 2484 is triggered to begin the global actuation sequence.

The actuation sequence, also referred to as the global update sequence, begins at step 2486 of method 2470, with the application of an actuation voltage $V_{at}$, e.g. 40 V, to the charge interconnect 2450. As a consequence of step 2486, the voltage $V_{at}$ is now imposed simultaneously across all of the shutter-close actuators of all the shutter assemblies 2444 in control matrix 2440. Next, at step 2487, the potential on the common drive interconnect 2462 is grounded. In this first control logic (with the shutter common potential 2455 held near to ground) a grounded common drive interconnect 2462 reduces the voltage drop across all of the shutter-open actuators of all shutter assemblies 2444 to a value substantially below the maintenance voltage $V_m$. The control matrix 2440 then continues to maintain these actuator voltages (from steps 2486 and 2487) for a period of time sufficient for all actuators to actuate (step 2488). For the example given in method 2470, step 2488 acts to reset and close all actuators into an initial state. Alternatives to the method 2470 are possible, however, in which the reset step 2488 acts to open all shutters. For this case the common drive interconnect 2462 would be electrically connected to the shutter-closed actuator of all shutter assemblies 2444.

At the next step 2490 the control matrix grounds the charge interconnect 2450. The electrodes on the shutter-close actuators in shutter assembly 2444 provide a capacitance which stores a charge after the charge interconnect 2450 has been grounded and the charging transistor 2456 has been turned off. The stored charge acts to maintain a voltage in excess of the maintenance voltage $V_m$ across the shutter-close actuator.

After all actuators have been actuated and held in their closed position by a voltage in excess of $V_m$, the data stored in capacitors 2459 can now be utilized to set an image in control matrix 2440 by selectively opening the specified shutter assemblies (steps 2492-2494). First, the potential on the global actuation interconnect 2454 is set to ground (step 2492). Step 2492 makes it possible for the discharge switch transistor 2458 to turn-on in accordance to whether a data voltage has been stored on capacitor 2459. For those pixels in which a voltage has been stored on capacitor 2459, the charge which was stored on the shutter-close actuator of shutter assembly 2444 is now allowed to dissipate through the global actuation interconnect 2454.

Next, at step 2493, the voltage on the common drive interconnect 2462 is returned to the actuation voltage $V_{at}$, or is set such that the potential difference between the common drive interconnect 2462 and the shutter common interconnect 2455 is greater than an actuation voltage $V_{at}$. The conditions for selective actuation of the pixels have now been set. For those pixels in which a charge (or voltage $V_d$) has been stored on capacitor 2459, the voltage difference across the shutter-close actuator will now be less than the maintenance voltage $V_m$ while the voltage across the shutter-open actuator (which is tied to the common drive 2462) will at $V_{at}$. These selected shutters will now be caused to open at step 2494. For those pixels in which no charge has been stored on capacitor 2459, the transistor 2458 remains off and the voltage difference across the shutter-close actuator will be maintained above the maintenance voltage $V_m$. Even though a voltage $V_{at}$ has been imposed across the shutter-open actuator, the shutter assembly 2444 will not actuate at step 2494 and will remain closed. The control matrix 2440 continues to maintain the voltages set after steps 2492 and 2493 for a period of time sufficient for all selected actuators to actuate during step 2494. After step 2494, each shutter is in its addressed state, i.e., the position dictated by the data voltages applied during the addressing and actuating method 2470. To set an image in a subsequent video frame, the process begins again at step 2472. In alternate embodiments, the positions of the steps 2486 and 2487 in the sequence can be switched, so that step 2487 occurs before step 2486.

In the method 2470, all of the shutters are closed simultaneously during the time between step 2488 and step 2494, a time in which no image information can be presented to the viewer. The method 2470, however, is designed to minimize this dead time (or reset time), by making use of data store capacitors 2459 and global actuation interconnect 2454 to provide timing control over the transistors 2458. By the action of step 2472, all of the data for a given image frame can be written to the capacitors 2459 during the addressing sequence (steps 2474-2485), without any immediate actuation effect on the shutter assemblies. The shutter assemblies 2444 remain locked in the positions they were assigned in the previous image frame until addressing is complete and they are uniformly actuated or reset at step 2488. The global actuation step 2492 allows the simultaneous transfer of data out of the data store capacitors 2459 so that all shutter assemblies can be brought into their next image state at the same time.

As with the previously described control matrices, the activity of an attached backlight can be synchronized with the addressing of each frame. To take advantage of the minimal dead time offered in the addressing sequence of method 2470, a command to turn the illumination off can be given between step 2484 and step 2486. The illumination can then be turned-on again after step 2494. In a field-sequential color scheme, a lamp with one color can be turned off after step 2484 while a lamp with either the same or a different color is turned on after step 2494.

In other implementations, it is possible to apply the method 2470 of FIG. 7 to a selected portion of the whole array of pixels, since it may be advantageous to update different areas or groupings of rows and columns in series. In this case a number of different charge interconnects 2450, global actuation interconnects 2454, and common drive interconnects 2462 could be routed to selected portions of the array for selectively updating and actuating different portions of the array.

As described above, to address the pixels 2442 in the control matrix 2440, the data voltage $V_d$ can be significantly less than the actuation voltage $V_{at}$ (e.g., 5V vs. 40V). Since the actuation voltage $V_{at}$ is applied once a frame, whereas the data voltage $V_d$ may be applied to each data interconnect 2448 as may times per frame as there are rows in the control matrix 2440, control matrices such as control matrix 2440 may save a substantial amount of power in comparison to control matrices which require a data voltage to be high enough to also serve as the actuation voltage.

It will be understood that the embodiment of FIG. 6 assumes the use of n-channel MOS transistors. Other embodiments are possible that employ p-channel transistors, in which case the relative signs of the bias potentials $V_{at}$ and $V_d$ would be reversed. In alternative implementations, the storage capacitor 2459 and write-enable transistor 2457 can be replaced with alternative data memory circuits, such as a DRAM or SRAM circuits known in the art. In alternate implementations, semiconductor diodes and/or metal insulator metal sandwich type thin films can be substituted as switches in place of transistors in control matrix 2440. Examples of these substitutions are described in U.S. patent application Ser. No. 11/326,696 which is incorporated herein by references in its entirety.

As stated above, it is advantageous to periodically or occasionally reverse the sign of the voltages that appear across the actuators of shutter assembly 2442. U.S. patent application Ser. No. 11/326,696 describes the use of two control logics to provide a periodic polarity reversal and ensure 0V DC average operation. To achieve polarity reversal in the second control logic several of the voltage assignments illustrated and described with respect to method 2470 of FIG. 7 are changed, although the sequencing of the control steps remains the same.

In the second control logic, the potential on the shutter common interconnect 2455 is maintained at a voltage near to $V_{at}$ (instead of near ground as was the case in the first control logic). In the second control logic, at step 2478, where the logic is set for the opening of a shutter assembly, the data interconnect 2448 is grounded instead of taken to $V_d$. At step 2480, where the logic is set for the closing of a shutter assembly, the data interconnect is taken to the voltage $V_d$. Step 2486 remains the same, but at step 2487 the common drive interconnect is set to the actuation voltage $V_{at}$ in the second control logic instead of to ground. At the end of step 2487 in the second control logic, therefore, each of the shutter common interconnect 2455, the common drive interconnect 2462, and the charge interconnect 2450 are set to the same voltage $V_{at}$. The image setting sequence then continues with grounding of the global actuation interconnect 2454 at step 2492—which has the effect in this second logic of closing only those shutters for which a voltage $V_d$ was stored across the capacitor 2459. At step 2493 in the second control logic the common drive interconnect 2462 is grounded. This has the effect of actuating and opening any shutters that were not otherwise actuated at step 2492. The logical state expressed at step 2494, therefore, is reversed in the second control logic, and the polarities are also effectively reversed.

The control matrix 2440 can alternate between the control logics between every frame or between alternate sub-frame images or on some other periodic basis, for instance once every second. Over time, the net potentials applied to the shutter assemblies 2444 by the charge interconnect 2450 and the shutter common interconnect 2455 average out to 0V.

Algorithms for Coordination of Actuation and Lamp Illumination

Certain algorithms may be used to improve the efficiency of a display device by overlapping certain pixel addressing, circuit driving and lamp illumination phases. In addition to improving aspects like display brightness and power efficiency, the ability to address and actuate a display more efficiently with respect to time provided by such overlapping algorithms allows for additional time to create images for both the left eye and the right eye for use in the display of 3-dimensional images. These algorithms will be described below with respect to the circuits described above and as disclosed in U.S. patent application Ser. Nos. 11/811,842, 12/652,477, 11/643,042, and 11/326,900 which are incorporated herein by reference. Two examples of such circuitry which benefit from the below algorithms are described above as control matrix 500 of FIG. 5A, referred to as the S-latch drive and the control matrix 2440 of FIG. 6, referred to as the Hybrid drive. It will be understood by one of ordinary skill in the art that the algorithms described below can also be applied to other circuits in addition to those disclosed in the referenced patent applications. In addition, it will be understood by one of ordinary skill in the art that the algorithms described herein can be used to drive other light modulators in addition to MEMS shutters. For example, other light modulators such as electrowetting, light tap and LCD light modulators may be used in combination with the algorithms described herein.

Figure 8A:
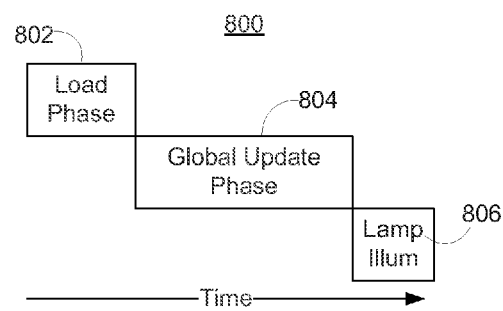
FIG. 8A is a phase diagram for image generation, according to an illustrative embodiment of the invention.

FIG. 8A is a phase diagram 800 for image generation, according to an illustrative embodiment of the invention. The phase diagram 800 includes Data Load phase 802, Global Update phase 804, and lamp illumination phase 806. The image writing operation consists of these three independent phases for each bit that is displayed. The timing and control of the phases are carried out, for example, by controller 156 in display apparatus 100 in FIG. 1B.

In the Data Load phase 802 there is a fixed time required to load 1 bit of data in memory for each of the pixels of the display. The data can be '1' or '0' corresponding to desired shutter position to be 'open' or 'closed'. In the Global Update phase (GUP) 804 there is a fixed time required to allow the shutters to move to the new positions as indicated by the data load. The length of this time depends on the speed at which shutter moves from open to close or close to open. The amount of time required for this phase depends on underlying circuitry and the physical construction of the shutter. The Global Update Phase 804 may include one or more sub-phases and the transmission of one or more different global update signals. Two examples of such circuitry are given by control matrix 500 of FIG. 5A, referred to herein as the S-latch drive and the control matrix 2440 of FIG. 6, referred to herein as the Hybrid drive.

In the Hybrid drive the Global Update phase 804 is divided into two sub-phases. During the first phase, every shutter is commanded to go into the closed position. During the second phase, the shutter is commanded to go into the open position depending on the data that is loaded on the pixel. For example, if the data is 1, the shutter will move to the open position. If the data is 0, the shutter will remain in the closed position. As a result of this operation scheme, the duration of the global update phase 104 is about twice the time it takes for the shutter to switch states.

In the S-Latch Drive, the Global Update phase 804 may consist of only one phase or sub-phase. The shutter is commanded to go to the open or closed position depending on the data that is loaded on the pixel. For example, if the data is 1, the shutter will remain in or move to the open position depending on its prior state. If the data is 0, the shutter will remain in or move to the closed position depending on its prior state. As a result of this operation scheme, the duration of the global update phase 804 for the S-latch drive circuit is equal to time it takes for the shutter to switch states. Thus, the S-latch drive provides a much shorter Global Update phase 804 time, which in turn enables longer LED duty cycles, especially if the shutter speed is slow.

The lamp illumination phase 806 shows the time during which one or more lamps (either R, G or B or combinations there of) may be turned 'on' in order to illuminate the display. In alternative embodiments, other colors or lamps (including without limitation, white, cyan, purple, and magenta) or combinations thereof may be illuminated. A number of different types of lamps can be employed in the displays, including without limitation: incandescent lamps, fluorescent lamps, lasers, light emitting diodes (LEDs), or any other suitable light source known to those of skill in the art. For example, the illumination phase may include illuminating one of more of lamps 162-167 in display apparatus 100 of FIG. 1B. The time duration is variable depending on the bit being represented. The relative weight of the time duration with respect to each other can be a binary or non-binary. Each bit time is calculated in such a way to show certain number of gray scale levels of brightness (typically 8 bit or 255 gray levels). Examples of field sequential color algorithms are described with respect to FIGS. 1C and 1D above. Gray scale technique is described in more detail in U.S. patent application Ser. No. 11/643,042 which is incorporated by reference herein in its entirety. The Ser. No. 11/643,042 application describes techniques for yielding detailed images. Each bit of RGB color is carefully organized in an algorithm to generate one frame of image. The frame rate of the image generation has to be fast enough to produce a flicker free image. Typically that rate is 60 Hz for standard displays. Mechanically actuated displays can produce flicker free operation at 45 Hz also, depending on their ability to perform bit splitting and other such methodologies. Total lamp illumination time in a frame (LED duty cycle) is preferably optimized for a good and low power display operation.

The total illumination time within a frame (LED Duty cycle) is what determines the brightness of the display. The higher the lamp duty cycle, the higher the brightness of the display. Lamp duty cycle affects power as well as brightness. The reason it affects power is because a lamp's optical response to electrical stimulus is not linear. It is a power law with power coefficient less than 1. Hence driving lamps at low currents (and pulse brightness) is a more efficient use of electrical power. Increased lamp duty cycle also provides better image performance that is associated with not having large blanking time between lamp outputs. Such blanking times can worsen image artifacts like dynamic false contour (DFC) and color breakup. Additionally, increased lamp duty cycle is important because with increased display size and resolution, both data load time and shutter travel time increase significantly, thereby reducing the time for which lamps can be kept illuminated within a frame time.

Figure 8B:
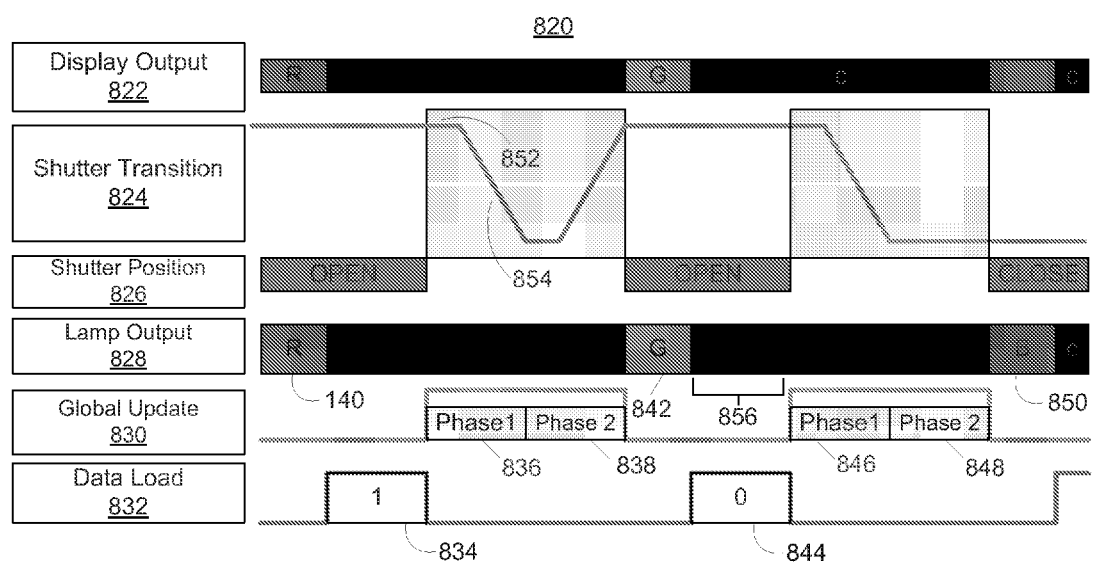
FIG. 8B is a timing diagram for image generation corresponding to the phase diagram of FIG. 8A, according to an illustrative embodiment of the invention.

The phase diagram 800 of FIG. 8A represents the most basic method of driving a display system. The algorithm presented in phase diagram 800 is very inefficient because the lamp duty cycle will be quite small. The timing diagram 820 of FIG. 8B corresponds to this inefficient driving method with a resulting low lamp duty cycle. The timing diagram 820 of FIG. 8B includes information relating to Display Output 822, Shutter Transition 824, Shutter Position 826, Lamp Output 828, Global Update 830 and Data Load 832. The Shutter Transition information 824 includes delay time 852 and shutter switch time period 854. As shown in timing diagram 820, one or more shutters may close during shutter switch time 854, and re-open during phase 2 838 of the Global Update 830. The lamp output information 828 includes a red color bit 840, a green color bit 842 and a blue color bit 850. The Global Update 830 includes a first update signal split into a first signal phase 836 and a second signal phase 838, and a second update signal split into a first signal phase 846 and a second signal phase 848. It will be understood by those of skill in the art that the Global Update 830 may include more or less than 2 update signals as necessary. The Data load information 132 includes a data signal 834 representing a "1", and a data signal 844 representing a "0." It will be understood by those of skill in the art that the data signals labeled "1" and "0" in FIG. 8B (as well as the following figures) are illustrative examples and not intended to limit the type of data that may be sent during Data Load phase 832. For example, during the Data Load phase 832, and more particularly, at each data load signal 834 and 844, more than one set of data may be sent to one or more pixels or rows of pixels in the entire array. For example, during the time it takes to load data 834 and 844, both "0" and "1" data or a combination of both may be sent to one or more, or even the entire array of pixels. Referring to the hybrid drive addressing method 2470 of FIG. 7, the data load signals 834 and 844 may represent all of the data loading steps inclusive between steps 2474 and 2485, including the sequential repetition of those steps for the loading of data for each row in the array. Lamp output 828 is the output of the backlight in synchronization with the rest of the system. Shutter Position 826 is indicated in between Shutter Transitions 824.

Timing diagram 820 corresponds to driving a Hybrid circuit, described in more detail above with respect to FIGS. 6 and 7. In this example, the shutter starts in an 'open' position as indicated by the Shutter Position information 826. At the beginning of an addressing cycle data is loaded to the display with data signal 834. In timing diagram 820 data signal 834 represents "1" data corresponding to an 'open' shutter state. The duration of the data signal 834 application represents the Data Load phase 802 of phase diagram 800. The next phase, as represented in the algorithm depicted in phase diagram 800, is the Global Update phase 804. Global Update phase 804 is initiated with a global update signal. In certain embodiments, the Global Update phase 804 does not begin until the Data Load phase 802 is completely finished. Because this example uses a Hybrid drive, the global update signal is split into two signal phases 836 and 838. As described above, during phase 1 of the global update 836 all of the shutters of the display are reset or driven into a 'closed' state. Signal phase 1 of the global update signal may correspond to the steps 2486 through 2490 of the addressing method 2470. This transition is depicted in Shutter Transition information 824 by portion 854 which shows the shutter moving from an open to closed state. During signal phase 2 of the global update 838 the shutters are driven into the state indicated by the data loaded during the Data Load phase 802. Signal phase 2 of the global update signal may correspond to the steps 2492 through 2494 of the addressing method 2470. In the example of timing diagram 820, during signal phase 2 the shutter is driven into an 'open' state corresponding to the '1' data received in data signal 834. After the initiation of signal phases 1 and 2 of the global phase 836, 138 but prior to shutter movement 854, there is a delay time 152. Thus, the duration of the Global Update phase 804 is 2× (shutter delay time 852+shutter switch time 854).

The final phase of the example algorithm depicted in phase diagram 800 is the lamp illumination phase 806. In certain embodiments, the lamp illumination phase 806 begins after the Global Update phase 804 is completely finished and the shutters have moved to their intended states. In the example shown in timing diagram 820, the shutter has moved to the 'open' state, thereby displaying the lamp illumination corresponding to green light, represented by lamp output 842. The duration of the lamp output 842 is a result of the bit it represents. The effect of the algorithm sequence shown in timing diagram 820 would be that orange color would be displayed since no blue will be transmitted through since at that time the shutter is closed. In the example shown in timing diagram 820, the next data signal 844 is asserted after the lamp output 142 is finished. The shutter remains 'open' until the data signal 844 is finished loading in the Data Load phase of the next frame addressing cycle. As shown in timing diagram 820, there is a large lamp blanking time 856 in which the lamp is turned off, but the shutter is still open. These lamp blanking times result in a low lamp duty cycle and, accordingly, inefficient operation of the display device.

Figure 9A:
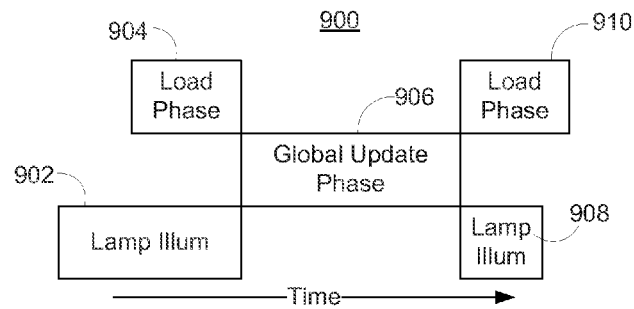
FIG. 9A is another phase diagram for image generation, according to an illustrative embodiment of the invention.

FIG. 9A is another phase diagram 900 for image generation, according to an illustrative embodiment of the invention. Phase diagram 900 represents a display algorithm for driving a display apparatus which increases the lamp duty cycle with respect the algorithm of phase diagram 800. Phase diagram 900 includes lamp illumination phase 902, Data Load phase 904, Global Update phase 906, Data Load Phase 910 and lamp illumination phase 908.

In phase diagram 900 there is overlapping of the data load phases and lamp illumination phases. For example, Data Load phase 904 is overlapped in time with lamp illumination phase 902. Similarly, Data Load phase 910 is overlapped in time with lamp illumination phase 908. In certain embodiments, data (for the next bit) can be loaded in the "pixel memory" of the pixel that is to be displayed while lamp illumination is occurring. The algorithm depicted by phase diagram 900 requires special circuit design in the backplane of the display so that data can be held in memory without causing shutter actuation until the global update phase is executed. For example a Hybrid drive circuit 2440, described about with respect to FIGS. 6 and 7, can be used to drive the display. In the hybrid circuit 2440, the data store capacitor 2459 can be loaded with data in preparation for the next image frame. In certain embodiments, as long as a voltage Voff is applied to the global actuation interconnect 2454, the data stored in capacitor 2459 does not affect the movement of the shutters. In certain embodiments, only after the voltage on interconnect 2454 is set to ground, as is indicated at step 2492 of the method 2470, can the shutters begin to move in an update cycle according to the data stored on capacitor 2459.

The S-latch drive circuit 500 described with respect to FIGS. 5A and 5B is another example of a control matrix that can be used for driving a display with overlap between the Data Load phase and the lamp illumination phase. In the S-latch circuit 2440, the data store capacitor 538 may be loaded with data in preparation for the next image frame. In certain embodiments, as long as a voltage Voff is applied to the update interconnect 522, the data stored in capacitor 538 does not change the state of the latch nor affect the movement of the shutters. In certain embodiments, only after the update is activated, at step 574 of the method 550, can the shutters begin to move in an update cycle according to the data stored on capacitor 538.

Figure 9B:
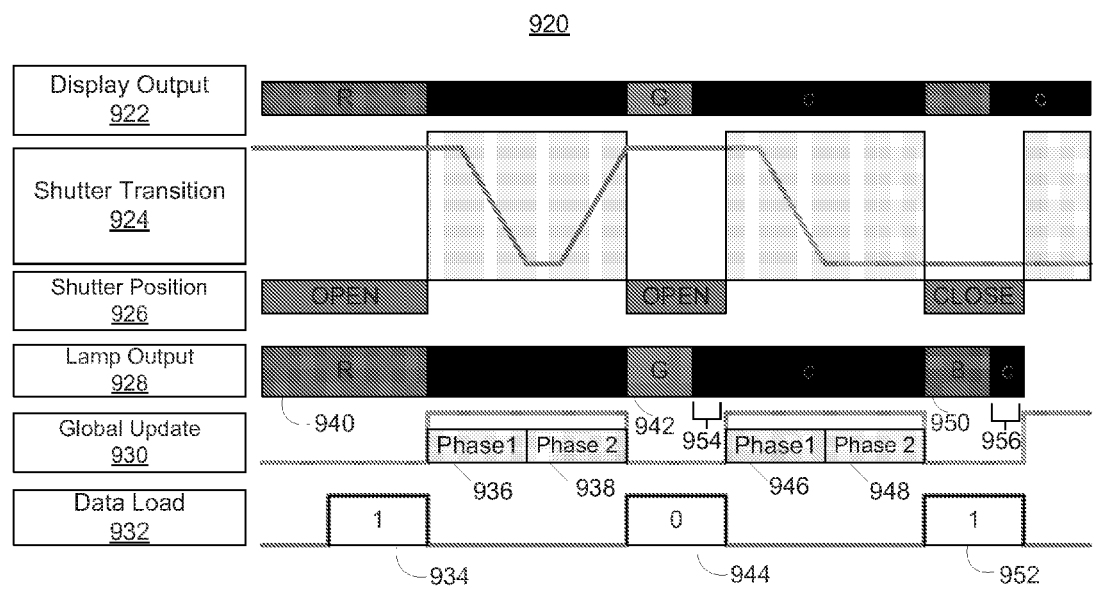
FIG. 9B is a timing diagram for image generation corresponding to the phase diagram of FIG. 9A, according to an illustrative embodiment of the invention.

FIG. 9B shows a timing diagram 920 for image generation corresponding to the phase diagram of FIG. 9A, according to an illustrative embodiment of the invention. Timing diagram 920 is similar to timing diagram 820 of FIG. 8B, except that lamp outputs 940, 942, 950 overlap with the data signals 934, 944, 952. As with timing diagram 820, the data signal 934 (and similar data signals shown in FIGS. 10B through 13B) may represent a time period required for the loading of data into multiple pixels, multiple rows, and/or the entire array of light modulators in the display. In timing diagram 920 the data signal 934 is completely enclosed under Red lamp output 940 (due to the large bit lengths). This allows for increased lamp duty cycle compared to the example shown in timing diagram 920. In the case of the green output 942 and blue output 950, which have shorter bit lengths, the data load phase duration is longer than the green and blue lamp outputs 942, 950 and therefore lamp blanking intervals 954, 956 must be inserted before the Global Update phase 906 is initiated. Thus, if there are many short bits to define good color depth, significant lamp duty cycle is lost.

Figure 10A:
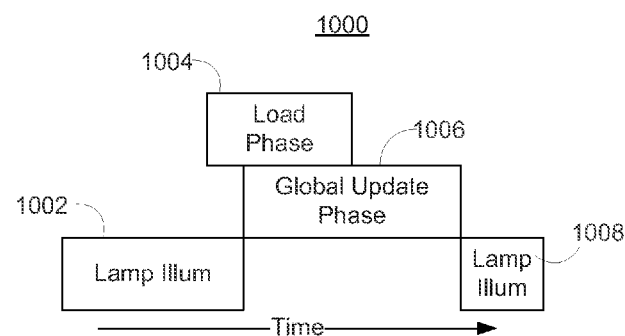
FIG. 10A is another phase diagram for image generation, according to an illustrative embodiment of the invention.

FIG. 10A is another phase diagram 1000 for image generation, according to an illustrative embodiment of the invention. Phase diagram 1000 represents a display algorithm for driving a display apparatus which increases the lamp duty cycle with respect the algorithm of phase diagrams 800 and 900. Phase diagram 1000 includes lamp illumination phase 1002, Data Load phase 1004, Global Update phase 1006, and lamp illumination phase 1008. In phase diagram 1000 there is overlapping of the data load phase 1004 with both the lamp illumination phase 1002 and the Global Update phase 1006. The algorithm shown in phase diagram 1000 can be implemented on a Hybrid drive circuit (described in more detail with respect to FIGS. 6 and 7 above) as described with respect to FIG. 3B.

Figure 10B:
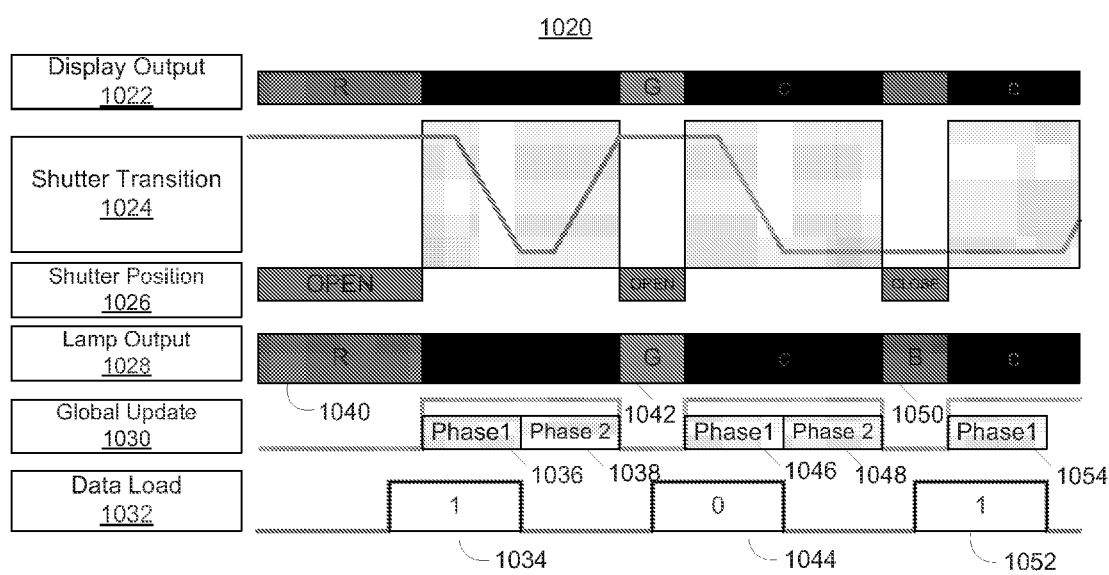
FIG. 10B is a timing diagram for image generation corresponding to the phase diagram of FIG. 10A, according to an illustrative embodiment of the invention.

FIG. 10B shows a timing diagram 1020 for image generation corresponding to the phase diagram of FIG. 10A, according to an illustrative embodiment of the invention. Timing diagram 1020 is similar to timing diagram 920 of FIG. 9B, except that the data load signals 1034, 1044, 1052 overlap with the lamp outputs 1040, 1042, 1050 and the first phase of the global update signals 1036, 1046, 1054. In the first signal phase of the global update signal 1036, 1046, 1054, the circuit update signal 2454 of the Hybrid drive is inactive, so pixel memory does not interact with the data that is already loaded on the shutter (defining the shutter state). The first signal phase of the global update signal may correspond to a modulator reset phase and to the steps 2486 through 2490 of the addressing method 2470. As a result, data can be loaded into the pixel memory without affecting the shutter potential and shutter travel and position. Because the data load signals 1034, 1044, 1052 overlap with the first signal phase of the global update signals 1036, 1046, 1054 it eliminates the lamp blanking times found in timing diagrams 820 and 920. With the lamp blanking times eliminated, the lamp duty cycle is significantly improved, even in situations where the data load phase 1004 is significantly long. In the example algorithm shown in timing diagram 1020 the lamp illumination phase 1002 is not overlapped on with the Global Update phase 1006, and the global update signal 1036 is not asserted until the entire color bit 1040 has been displayed.

Figure 11A:
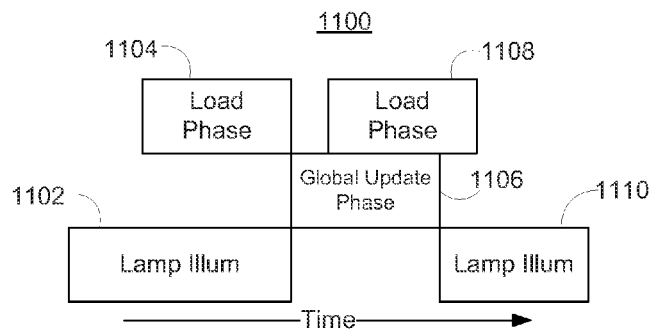
FIG. 11A is another phase diagram for image generation, according to an illustrative embodiment of the invention.

FIG. 11A is another phase diagram 1100 for image generation, according to an illustrative embodiment of the invention. In certain embodiments, phase diagram 1100 represents a display algorithm for driving a display apparatus using an S-latch drive circuit. The S-latch drive circuitry 500 is described in more detail above with respect to FIGS. 5A and 5B. Phase diagram 1100 includes lamp illumination phase 1102, Data Load phase 1104, Global Update phase 1106, Data Load phase 1108 and lamp illumination phase 1110. Similarly to phase diagram 1000, phase diagram 1100 includes overlapping of the data load phase 1108 with both the lamp illumination phase 1110 and the Global Update phase 1106. The algorithm shown in phase diagram 1100 can be implemented on an S-latch drive circuit as described below with respect to FIG. 11B.

Figure 11B:
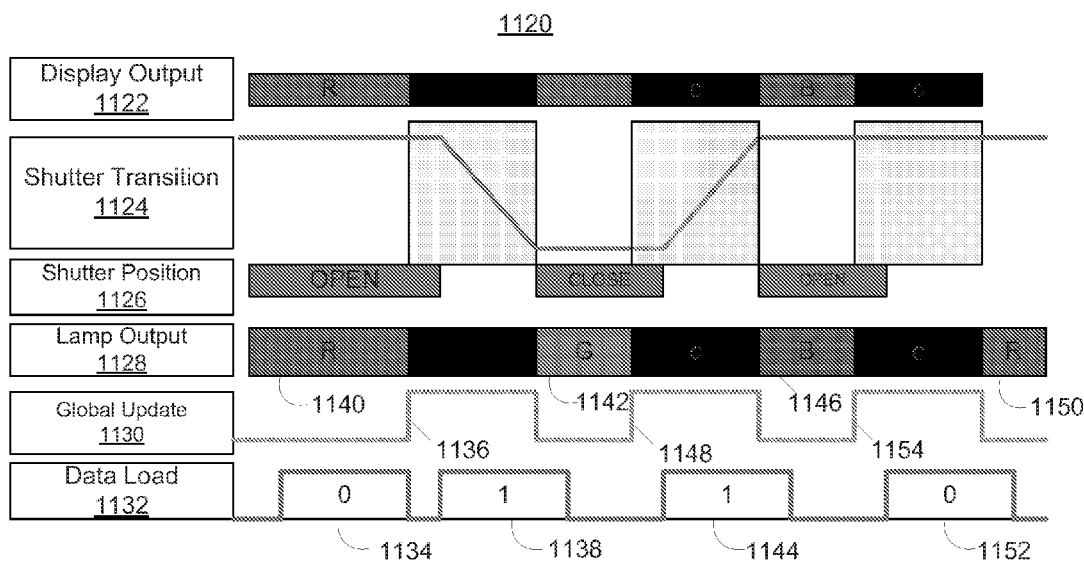
FIG. 11B is a timing diagram for image generation corresponding to the phase diagram of FIG. 11A, according to an illustrative embodiment of the invention.

FIG. 11B shows a timing diagram 1120 for image generation corresponding to the phase diagram of FIG. 11A, according to an illustrative embodiment of the invention. Timing diagram 1120 is similar to timing diagram 1020 of FIG. 10B, however it may be carried out on an S-latch drive circuit, such as the circuit 500 of FIG. 5A and using the method 550 of FIG. 5B. In the S-latch drive, after a brief period of time required to latch the data on the shutter node, referred to as the update latch step 554 in the method 550, the data can be loaded into the pixel memory during the rest of the Global Update phase 1106. The Global Update phase 1106 may be much smaller for the S-Latch drive circuitry when compared to the Hybrid drive due to the fact that the shutter only travels once (open to close or close to open or just stay in open or close position) during the Global Update phase 1106. Accordingly, in certain embodiments, the Global Update signal 1136, 1148, 1154 used in the S-latch drive circuit does not require two separate phases, and therefore has a shorter duration. In certain embodiments, the circuit update signal of the S-latch drive is active for only a short period of time during the update latch step, i.e. between the steps 574 and 578 of the method 550. Thereafter, during the shutter actuation step 556, the pixel data storage capacitor (which constitutes the pixel memory) is no longer in electrical communication with the shutter. Therefore data can be loaded into the storage capacitor during the actuation step 556 without disturbing shutter movement.

The update latch step 554, including the data update steps 574 to 578, is sometimes referred to as an electrical setting phase of the global update signal. In some embodiments, during the electrical setting phase, the lamps may remain in the "on" state while the data loading signals remain inactive. The shutter actuation step 556 of the method 550 is sometimes referred to as the mechanical reaction phase of the global update signal. In some embodiments, during the mechanical reaction phase, the lamps remain in the "off" state while data loading can continue. The mechanical reaction phase and the data loading phase are allowed to overlap in time.

In timing diagram 1120, the data load signals 1138, 1144, 1152 overlap with the lamp outputs 1142, 1146, 1150 and the global update signals 1136, 1148, 1154. As a result of the overlap between the data load signals 1134, 1144, 1152 and the global update signals 1136, 1146, 1154 there is no lamp blanking time required before the next global update signal. Therefore, the lamp duty cycle is significantly improved, even in situations where the data load phase 1138, 1144, 1152 is significantly long. Moreover, because the Global Update phase 1106 is shorter in duration when compared with the Hybrid drive circuit, the S-latch allows for even larger lamp duty cycle when compared to the Hybrid drive. In the example algorithm shown in timing diagram 1120 the lamp illumination phase 1102 is not overlapped on with the Global Update phase 1106, and the global update signal 1136 is not asserted until the entire color bit 1140 has been displayed.

Figure 12A:
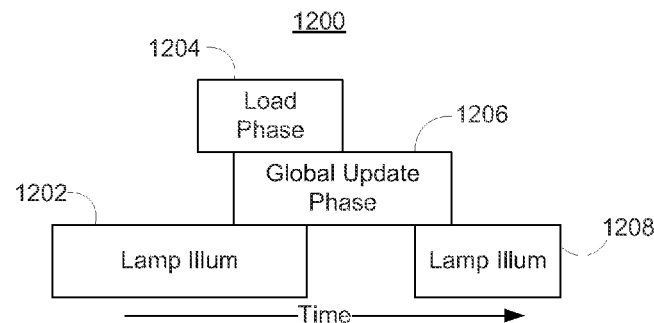
FIG. 12A is another phase diagram for image generation, according to an illustrative embodiment of the invention.

FIG. 12A is another phase diagram 1200 for image generation, according to an illustrative embodiment of the invention. Phase diagram 1200 represents a display algorithm for driving a display apparatus which increases the lamp duty cycle with respect the algorithm of phase diagram 1000. Phase diagram 1200 includes lamp illumination phase 1202, Data Load phase 1204, Global Update phase 1206, and lamp illumination phase 1208. In phase diagram 1200 there is overlapping between each of the data load phase 1204, lamp illumination phase 1202 and Global Update phase 1206. The algorithm shown in phase diagram 1200 may be implemented on a Hybrid drive circuit, such as circuit 2440 described with respect to FIGS. 6 and 7.

During shutter operation, the shutter blocks light, or allows light to pass through. The display is designed with certain overlap between the shutter and the aperture plate slot underneath. This helps to reduce off-axis light leakage and provide good off-axis contrast. Due to this overlap, the shutter movement is not recorded as optical transmission change until the shutter has traveled for approximately 20% of its travel time. During this travel time, there is no change in the optical signal. For example, a closed shutter still appears closed and an open shutter still appears open optically. This shutter travel time, although part of the Global Update phase 1206, can be used as part of lamp illumination phase 1202 thereby providing additional lamp duty cycle. The algorithm illustrated in phase diagram 1200 can be applied to a Hybrid circuit without affecting optical quality of the image (i.e., contrast and color).

Figure 12B:
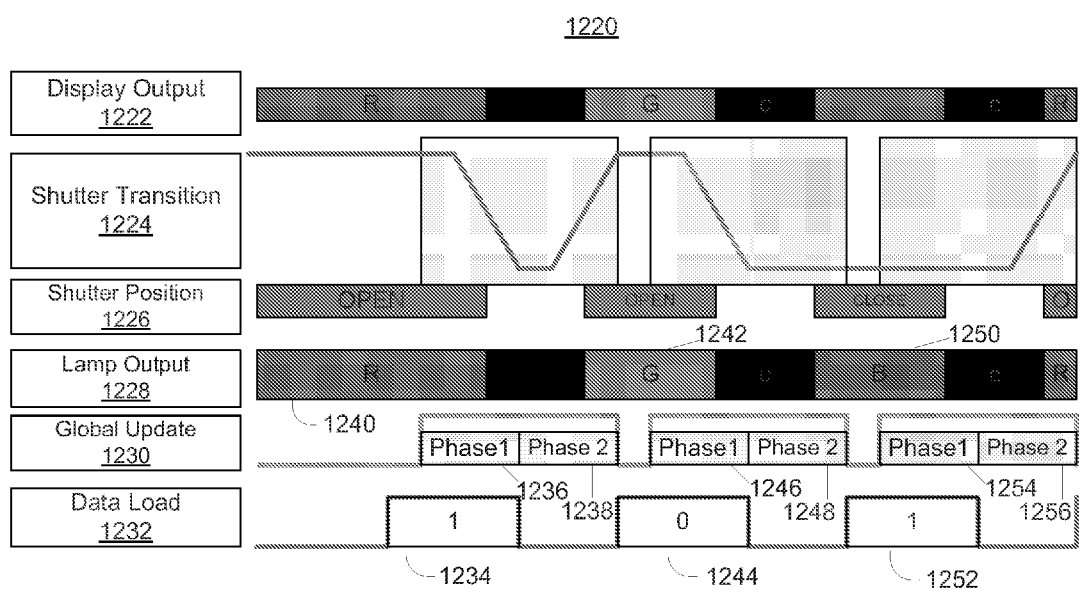
FIG. 12B is a timing diagram for image generation corresponding to the phase diagram of FIG. 12A, according to an illustrative embodiment of the invention.

FIG. 12B shows a timing diagram 1220 for image generation corresponding to the phase diagram of FIG. 12A, according to an illustrative embodiment of the invention. Timing diagram 1220 is similar to timing diagram 1020 of FIG. 10B, except that the lamp signals 1240, 1242, 1250 overlap with both phase 1 and 2 of the Global Update signal 1236, 1238, 1246, 1248, 1254, 1256.

Signal phase 1 of the Global Update signal 1236, 1246, 1254 is operated in such a way that all of the shutters move to a 'close' position in this phase. Signal phase 1 may constitute the reset phase of the global update signal, i.e. steps 2486 to 2488 of the method 2470. In this case, while traversing to the 'close' position, the shutter can still transmit a meaningful amount of light of the same color (that contributes to forming an image). Accordingly, lamp illumination can be kept in an 'on' state during phase 1 of the Global update signal 1236, 1246, 1254 and provide additional brightness boost to the display.

In signal phase 2 of the Global Update signal 1238, 1248, 1256, the shutters that need to move to the open position are driven to the 'open' position based on the date loaded for that pixel (steps 2490 to 2494 of method 2470). When the shutter is in a 'closed' state, the light leakage through the shutter is minimal. Therefore, the lamp can be switched to an 'on' state again without affecting the performance of the closed shutter (i.e. without light leakage). As a result, additional light transmission can be provided during the shutter transition from 'closed' to 'open' for the particular shutters that are being driven to the open state. The increase in light transmission as a result of overlapping lamp illumination phase 1202, 1208 with the Global Update phase 1206 allows for higher lamp duty cycle when compared with timing diagram 1020 of FIG. 10B.

Figure 13A:
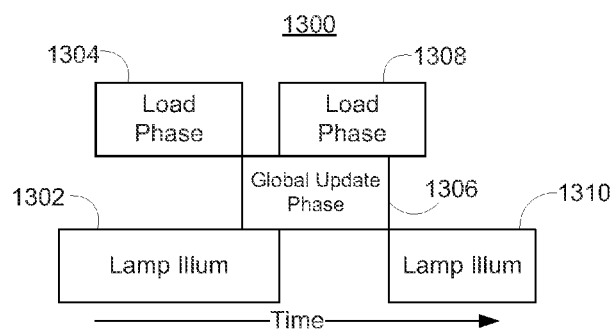
FIG. 13A is another phase diagram for image generation, according to an illustrative embodiment of the invention.

FIG. 13A is another phase diagram 1300 for image generation, according to an illustrative embodiment of the invention. Phase diagram 1300 represents a display algorithm for driving a display apparatus using an S-latch drive circuit, such as the circuit 500 of FIG. 5A and using the method 550 of FIG. 5B. Phase diagram 1300 includes lamp illumination phase 1302, Data Load phase 1304, Global Update phase 1306, Data Load phase 1308 and lamp illumination phase 1310. Similarly to phase diagram 1200, in phase diagram 1300 there is overlapping of the data load phase 1308 with both the lamp illumination phase 1310 and the Global Update phase 1306. The algorithm shown in phase diagram 1300 can be implemented on an S-latch drive circuit as described below with respect to FIG. 13B.

Figure 13B:
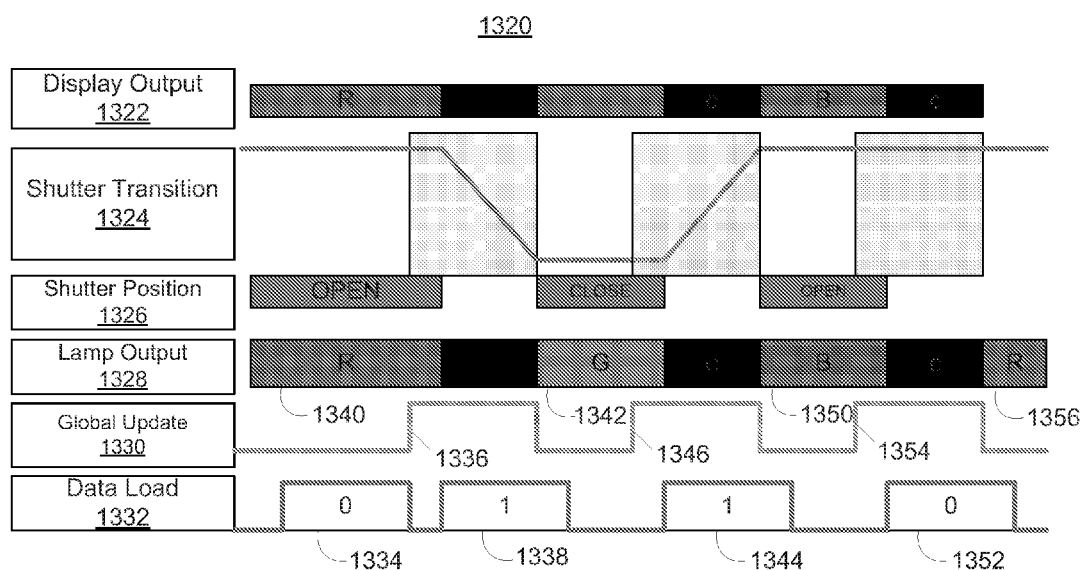
FIG. 13B is a timing diagram for image generation corresponding to the phase diagram of FIG. 13A, according to an illustrative embodiment of the invention.

FIG. 13B shows a timing diagram 1320 for image generation corresponding to the phase diagram of FIG. 13A, according to an illustrative embodiment of the invention. Timing diagram 1320 is similar to timing diagram 1220 of FIG. 12B, however it is designed to be carried out on an S-latch drive circuit, such as the circuit 500 of FIG. 5A and using the method 550 of FIG. 5B. In timing diagram 1320 the lamp outputs 1340, 1342, 1350 overlap with a short period at the beginning of the Global Update signals 1336, 1346, 1354. In one embodiment, shown in timing diagram 1320, the lamp outputs 1340, 1342, and 1350 can overlap with the update latch step 554 of the addressing method 550. However, in certain embodiments relating to the S-latch drive, the additional lamp overlaps during the shutter transition times, as described with respect to the Hybrid drive in timing diagram 1220, are not possible because the light transmission during the shutter travel phase can cause deterioration of display contrast and color. Specifically, if the lamps were illuminated during shutter transition, light would leak through pixels which were closing from an open position, but not from those which remained in a closed position from one frame to the next. Similarly, pixels which were open in their prior state would emit more light than pixels that were transitioning from closed to open. This disparity in light output from pixels intended to be in the same state cause the above-mentioned image deterioration. Notwithstanding the inability to illuminate the lamps during the transition time, the other overlaps of the different phases of the drive scheme allow for increased lamp duty cycle, or allow for the lamp duty cycle to be preserved even with slow shutter speed and longer data load times.

The following data tables provide data on the level of improvement to lamp duty cycle when using the overlap algorithms (as described above) on both Hybrid and S-latch drive circuits for a 3.7" VGA Display at 216 ppi:

| HYBRID DRIVE WITHOUT LOAD AND LAMP OVERLAP | | |
|---|---|---|
| Shutter Speed (us) | 150 | 230 |
| GUT (us) | 300 | 460 |
| LED Duty cycle | 45% | 11% |

| HYBRID DRIVE WITH OVERLAPS | | | |
|---|---|---|---|
| Shutter Speed (us) | 150 | 230 | 300 |
| GUT (us) | 300 | 460 | 600 |
| LED Duty cycle | 66% | 44% | 16% |

| S-LATCH WITH OVERLAPS | | |
|---|---|---|
| Shutter Speed (us) | 150 | 300 |
| GUT (us) | 180 | 360 |
| LED Duty cycle | 76% | 51% |

As shown in the tables above, the lamp duty cycle for a Hybrid drive with shutter speed of 150 μsec increases from 45% to 66% when using an overlap algorithm, and from 11% to 44% when using an overlap algorithm on a Hybrid drive with a shutter speed of 230 μsec. Also, the S-latch shows significant improvement in lamp duty cycle over the Hybrid drive when using an overlap algorithm. When using an overlap algorithm on an S-latch drive with a shutter speed of 150 μsec the lamp duty cycle is 76% and at a shutter speed of 300 μsec the lamp duty cycle is 51%.

The invention may be embodied in other specific forms without departing from the spirit or essential characteristics thereof. The forgoing embodiments are therefore to be considered in all respects illustrative, rather than limiting of the invention.

What is claimed is:

1. A display comprising:
    an array of pixels, each of the pixels having a corresponding light blocking element;
    one or more light sources to direct light toward the pixels to form an image on the display; and
    a controller circuit capable of providing data to:
        actuate the light blocking elements during a first update phase comprising a first sub-phase corresponding to a first transition of a light blocking element and a second sub-phase corresponding to a second transition of the light blocking element,
        illuminate one or more of the light sources during a first lamp illumination phase, and
        load image data to the array of pixels during a first data loading phase, wherein:
            the first update phase overlaps at least partially in time with the first lamp illumination phase, and
            the image data is loaded during at least a portion of the first sub-phase of the first update phase.

2. The display of claim 1, wherein the first update phase corresponds to a first transition of the pixels to a reset state.

3. The display of claim 2, wherein the first transition of the pixels to the reset state includes positioning the light blocking elements of the pixels to a reset position.

4. The display of claim 2, wherein the controller circuit is further capable of providing data to actuate the light blocking elements during a second update phase, the second update phase occurring after the first update phase, the second update phase corresponding to transitioning one or more of the pixels to a second state from the reset state.

5. The display of claim 4, wherein the controller circuit is further capable of providing data to illuminate one or more of the light sources during a second lamp illumination phase, wherein the second update phase overlaps at least partially in time with the second lamp illumination phase.

6. The display of claim 5, wherein the controller circuit is further capable of providing data to load image data to the array of pixels during a second data loading phase, the second data loading phase overlapping at least partially in time with the second lamp illumination phase.

7. The display of claim 6, wherein the controller circuit is further capable of providing data to actuate the light blocking elements during a third update phase to transition the light blocking elements of the pixels to the reset state, the third update phase overlapping at least partially in time with one or both of the second data loading phase and the second lamp illumination phase.

8. A method of operating a display, the method comprising:
    loading, by a controller, image data to an array of pixels during a first data loading phase, each of the pixels having a corresponding light blocking element;
    actuating, by the controller, the light blocking elements of the pixels during a first update phase comprising a first sub-phase corresponding to a first transition of a light blocking element and a second sub-phase corresponding to a second transition of the light blocking element; and
    illuminating, by the controller, one or more light sources of the display to direct light towards the pixels to form an image on the display during a first lamp illumination phase, wherein:
        the first update phase overlaps at least partially in time with the first lamp illumination phase, and
        the image data is loaded during at least a portion of the first sub-phase of the first update phase.

9. The method of claim 8, wherein the first update phase corresponds to a first transition of the pixels to a reset state.

10. The method of claim 9, wherein the first transition of the pixels to the reset state includes positioning the light blocking elements of the pixels to a reset position.

11. The method of claim 8, the method further comprising:
    actuating the light blocking elements during a second update phase, the second update phase occurring after the first update phase, the second update phase corresponding to transitioning one or more of the pixels to a second state from the reset state.

12. The method of claim 11, the method further comprising:
    illuminating one or more of the light sources during a second lamp illumination phase, wherein the second update phase overlaps at least partially in time with the second lamp illumination phase.

13. The method of claim 12, the method further comprising:
    loading image data to the array of pixels during a second data loading phase, the second data loading phase overlapping at least partially in time with the second lamp illumination phase.

14. The method of claim 13, the method further comprising:
    actuating the light blocking elements during a third update phase to transition the light blocking elements of the pixels to the reset state, the third update phase overlapping at least partially in time with one or both of the second data loading phase and the second lamp illumination phase.

15. A circuit capable of actuating pixels of a display during a first update operation comprising a first sub-phase corresponding to a first transition of a light blocking element associated with a pixel and comprising a second sub-phase corresponding to a second transition of the light blocking element, illuminating one or more light sources of the display during a first lamp illumination operation, and loading image data to the pixels of the display during a first data loading operation, wherein the first update operation overlaps at least partially in time with the first lamp illumination operation, and the image data is loaded during at least a portion of the first sub-phase of the first update operation.

16. The circuit of claim 15, wherein the first update operation corresponds to a first transition of the pixels to a reset state.

17. The circuit of claim 16, wherein the circuit is further capable of actuating the pixels during a second update operation, the second update operation occurring after the first update operation, the second update operation corresponding to transitioning one or more of the pixels to a second state from the reset state.

18. The circuit of claim 17, wherein the circuit is further capable of illuminating one or more of the light sources during a second lamp illumination operation, wherein the second update operation overlaps at least partially in time with the second lamp illumination operation.

19. The circuit of claim 18, wherein the circuit is further capable of loading image data to the pixels during a second data loading operation, the second data loading operation overlapping at least partially in time with the second lamp illumination operation.

20. The circuit of claim 19, wherein the circuit is further capable of actuating the pixels during a third update operation to transition the pixels to the reset state, the third update operation overlapping at least partially in time with one or both of the second data loading operation and the second lamp illumination operation.

* * * * *